United States Patent
Morishita et al.

(10) Patent No.: US 7,461,187 B2
(45) Date of Patent: Dec. 2, 2008

(54) BUS SYSTEM AND DATA TRANSFER METHOD

(75) Inventors: Koichi Morishita, Tokyo (JP); Toshiaki Minami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 11/480,989

(22) Filed: Jul. 6, 2006

(65) Prior Publication Data

US 2007/0011366 A1 Jan. 11, 2007

(30) Foreign Application Priority Data

Jul. 7, 2005 (JP) ............... 2005-199142
Jul. 7, 2005 (JP) ............... 2005-199143
Nov. 15, 2005 (JP) ............... 2005/330651

(51) Int. Cl.
*G06F 13/42* (2006.01)
*G06F 3/00* (2006.01)

(52) U.S. Cl. ............ 710/60; 710/106; 710/305; 713/375; 713/400; 711/138

(58) Field of Classification Search ............ 710/29, 710/58–61, 105–106, 305–316; 713/375, 713/400–401, 500–503, 600–601; 711/138
See application file for complete search history.

(56) References Cited

U.S. PATENT DOCUMENTS

| 6,738,917 | B2 * | 5/2004 | Hummel et al. ............ 713/400 |
| 6,857,037 | B2 | 2/2005 | Messmer et al. ............ 710/300 |
| 6,963,989 | B1 * | 11/2005 | Cullum et al. ............ 713/401 |
| 7,069,376 | B2 * | 6/2006 | Mathewson et al. ......... 710/316 |
| 7,117,277 | B2 * | 10/2006 | Mathewson et al. ........... 710/58 |
| 2002/0087909 | A1 * | 7/2002 | Hummel et al. ............ 713/400 |
| 2004/0103230 | A1 | 5/2004 | Emerson et al. ............ 710/110 |
| 2006/0206645 | A1 * | 9/2006 | Bruce et al. ................ 710/240 |

OTHER PUBLICATIONS

PrimeCell® Infrastructure AMBA™ 3 AXI™ Register Slice (BP130), Revision: r0p0, Technical Overview, p. 1 to 12 (2004).

* cited by examiner

*Primary Examiner*—Christopher B. Shin
(74) *Attorney, Agent, or Firm*—Fitzpatrick, Cella, Harper & Scinto

(57) ABSTRACT

A bus system which transfers data from a first device to a second device includes a holding unit which holds data input from the first device, and a selecting unit which selects whether to output the data from the first device to the second device by holding the data by the holding unit or without holding the data by the holding unit.

20 Claims, 21 Drawing Sheets

F I G. 1
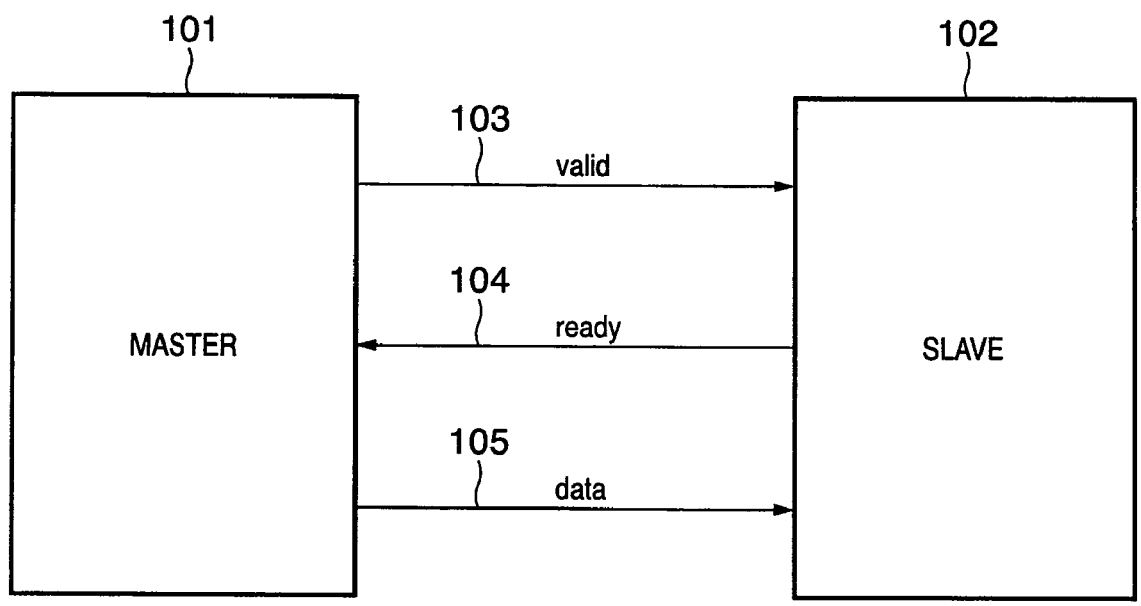

FIG. 10

| FREQUENCY | REGISTER SLICE SYSTEM | REGISTER SLICE BYPASS SYSTEM |
|---|---|---|
| 120MHz | ○ | ○ |
| 140MHz | ○ | × |
| 160MHz | ○ | × |
| 180MHz | ○ | × |
| 200MHz | ○ | × |

# BUS SYSTEM AND DATA TRANSFER METHOD

FIELD OF THE INVENTION

The present invention relates to a bus system which transfers data from a first device to a second device, and a data transfer method of the system.

BACKGROUND OF THE INVENTION

Recently, the micropatterning of processes advances, and the scale of circuits incorporated into LSIs has reached several tens of millions of gates.

Meanwhile, due to the influence of the downsizing of devices, various problems have become significant. Among them all, the increase in wiring delay inside an LSI poses particularly a serious problem.

An example which is largely influenced by this wiring delay inside an LSI is a system bus which connects modules by interconnections.

Also, IP (Intellectual Property) cores requiring high throughputs are recently abruptly increasing. For example, USB1.1 is replaced with USB2.0, and PCI is replaced with PCI-Express. Accordingly, demands for on-chip buses capable of high-speed throughput transfer are increasing (e.g., U.S. Pat. No. 6,857,037).

In June 2003, ARM announced the AXI (Advanced extensible Interface) protocol of AMBA3.0 as a standard of the next-generation on-chip buses by ARM, and this protocol is attracting attention. AMBA is an abbreviation of "Advanced Microcontroller Bus Architecture". The AXI has introduced the concept "channel" which the conventional AHB (Advanced High-Performance Bus) did not have, and improves the throughput of data transfer by this channel. More specifically, the AXI supports an independent transfer system using an address phase and data phase, and an out-of-order transfer system by which the result of a cycle inserted later can be fed forward.

As shown in FIG. 1, the "channel" is defined as a series of transfer paths in which a master 101 and slave 102 transfer data 105 by two-line handshake by using valid 103 and ready 104 as signals; the transfer source of the data 105 outputs the valid 103, and the transfer destination outputs the ready 104.

Referring to FIG. 1, one transfer is established in a cycle in which the valid 103 asserted by the master 101 and the ready 104 asserted by the slave 102 are simultaneously asserted.

As shown in FIG. 2, this AXI transfers data between a master 201 and slave 202 by using four channels, i.e., address 203, write data 205, read data 204, and write response 206. Since, therefore, data can be independently transferred in the address channel and data channel, address processes can be issued one after another so that the bus can be effectively used.

In addition, since out-of-order is supported, data from a slave having a small latency can be returned first. From the foregoing, it can be expected to increase the bus utilization efficiency by the AXI.

Note that the AXI is the definition of a protocol, and hence does not define the packaging of a bus connecting network. Normally, the network is presumably implemented by a crossbar structure or multilayer structure. Also, ARM supplies PrimeCell PL300 having a multilayer structure as its own IP (Intellectual Property) core.

On the other hand, a system having a plurality of CPUs, memories, and I/Os inside a system LSI is becoming popular, so these devices must be interconnected. However, a plurality of bus masters and bus slaves are not always evenly laid out inside the system LSI. Therefore, it is possible to find in the stage of a layout step that some connecting networks, particularly, high-load buses such as address buses and data buses cannot operate at the expected operating frequency any longer.

In this case, time and labor are wasted to lay out paths not meeting timings again and again, thereby ensuring timings at the expected operating frequency. In the worst case, it is necessary to lower the operating frequency, or increase the chip size.

Accordingly, these problems are solved by using a method by which a register is inserted in signals in a portion between a master and slave as a critical path, thereby dividing the path and reducing the register-register delay amount. In a point-to-point connection like the AXI described above, a protocol is defined by two-line handshake. Since information transferred by the handshake flows in one direction, a register can be inserted relatively easily. This method is called a "register slice" in the AXI.

Assume, for example, that the path delay between the master and slave is 2 ns and the operating frequency is 800 MHz (one period=1.25 ns), the delay value can be divided into about 1 ns by inserting a register slice between the two points. This makes it possible to achieve the necessary operating frequency.

FIG. 3 is a view showing a connection example in which a register slice is inserted in the point-to-point connection shown in FIG. 2. In this example shown in FIG. 3, register slices 301 and 302 are respectively inserted in the address channel and read data channel, thereby separating the path. Consequently, the latency from the issue of an address by the master 201 to the reception of read data increases by two cycles, but the system can operate at a double operating frequency as a maximum.

As described above, a high operating frequency can be assured by dividing a path by inserting registers in the point-to-point connection. Although the operating frequency rises, however, the performance does not unconditionally improve; the performance may adversely deteriorate depending on the relationship between the throughput and the increasing latency.

Also, it should be noted that signals propagate not only in the direction from the master to the slave, but also in the response signal (ready signal) direction from the slave to the master. No handshake timing is established if each signal is simply latched by one flip-flop (FF).

This is so because both the master and slave receive signals output from each other in the immediately preceding cycle.

To solve this problem, it is possible to form a register slice by using two FFs. However, the use of two FFs has the demerits that the circuit scale increases, and the latency also increases.

These demerits are eliminated if the register slice is formed by using not two FFs but two half-latches using the normal phase and reverse phase of a clock.

FIG. 16 shows an example of a register slice formed by half-latches. Referring to FIG. 16, the left side shows master (initiator)-side signals, and the right side shows slave (target)-side signals. The half-latches shown in FIG. 16 become transparent when the EN input is 1.

FIG. 17 shows a timing chart of the register slice. Referring to FIG. 17, each hatched portion represents a half-latch holding operation, i.e., the timing of EN=0.

As shown in FIG. 17, when the ready signal from the target is deasserted, a handshake timing is generated by masking the data holding operation.

The average transfer rate with respect to the operating frequency when burst transfer is performed by a 32-bit data bus connected by the point-to-point connection as shown in FIG. 2 will be explained below with reference to FIGS. 4 and 5.

FIG. 4 is a graph showing the relationship between the operating frequency and transfer rate when 16-burst transfer is performed. FIG. 5 is a graph showing the relationship between the operating frequency and transfer rate when 4-burst transfer is performed.

As shown in FIGS. 4 and 5, the latency difference between the cases in which the register slice is inserted and is not inserted appears as the average transfer rate difference. For example, when 16-burst transfer shown in FIG. 4 is performed, a transfer rate of 480 MBytes/s is obtained in a 120-MHz operation without the register slice. By contrast, when the register slice is inserted, the performance of the 120-MHz operation without the register slice cannot be exceeded unless the system is operated at an operating frequency of at least about 135 MHz or more.

Note that the number of cycles necessary for 16-burst transfer is 16 when the register slice is not inserted, and 18 when the register slice is inserted because the latency increases by "+2 cycles".

When 4-burst transfer shown in FIG. 5 is performed, a transfer rate of 480 MBytes/s is obtained in a 120-MHz operation without the register slice. By contrast, when the register slice is inserted, the performance of the 120-MHz operation without the register slice cannot be exceeded unless the system is operated at an operating frequency of at least about 195 MHz or more.

That is, the smaller the burst length to be supported, the larger the demand for the operating frequency when the register slice is inserted.

The above results indicate that if it is found in the layout stage that timing convergence at the target frequency is difficult, the following problem arises even when the target frequency can be achieved by inserting the register slice. That is, the target frequency corresponds to the performance before the register slice is inserted, so it is sometimes impossible to satisfy the performance any longer after the register slice is inserted because the latency increases. In this case, the performance must be met by selecting a higher frequency from selectable frequency candidates.

When the platform of developed system LSIs is to be expanded from the low-end product to the high-end product in accordance with the product specifications, the power consumption of a product having a low required performance can be made smaller when it is operated at a low operating frequency than when it is operated at a high operating frequency. However, if the operating frequency of a system LSI in which the register slice is simply inserted is lowered, it is sometimes impossible to satisfy the performance because the latency increases.

SUMMARY OF THE INVENTION

It is an object of the present invention to prevent an increase in latency.

It is another object of the present invention to provide a bus system which transfers data from a first device to a second device, comprising holding means for holding data input from the first device, and selecting means for selecting one of a process of outputting the data from the first device to the second device by holding the data by the holding means, and a process of outputting the data from the first device to the second device without holding the data by the holding means.

It is still another object of the present invention to provide a data transfer method in a bus system which comprises holding means for holding data input from a first device, and transfers data from the first device to a second device, comprising steps of selecting one of a process of outputting the data from the first device to the second device by holding the data by the holding means, and a process of outputting the data from the first device to the second device without holding the data by the holding means, and performing one of the process of outputting the data from the first device to the second device by holding the data by the holding means, and the process of outputting the data from the first device to the second device without holding the data by the holding means, in accordance with the selection in the selecting step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a view showing the concept of a channel in the AXI (Advanced extensible Interface) protocol;

FIG. 10 is a view showing the operating conditions after relayout;

DETAILED DESCRIPTION OF THE PREFERRED EMBODIMENTS

Preferred embodiments for practicing the invention will now be described in detail in accordance with the accompanying drawings.

Figure 2:
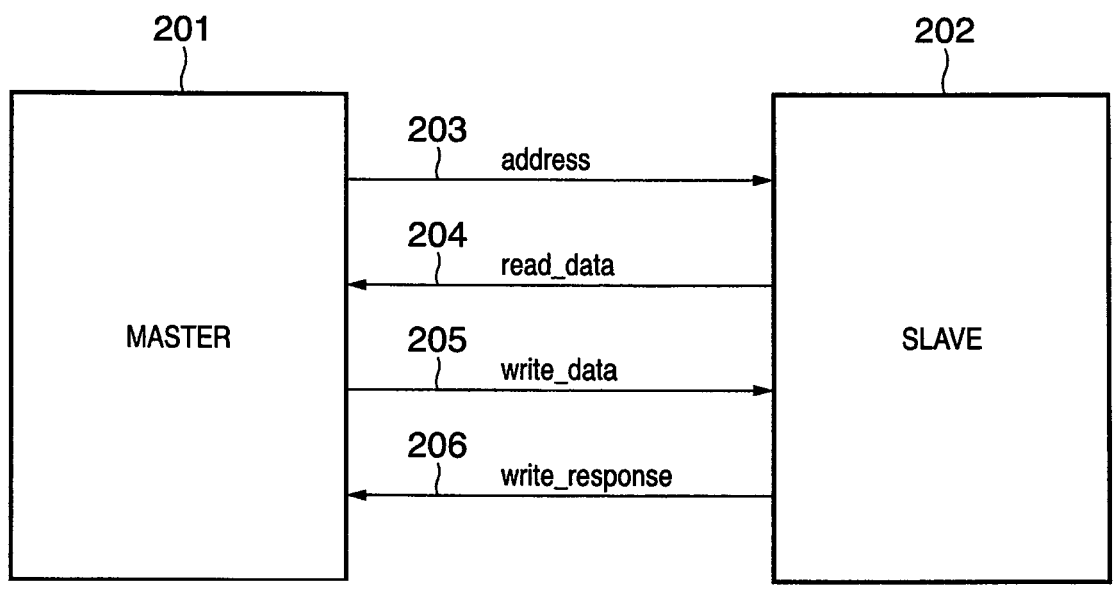
FIG. 2 is a view showing four channels used in master-slave data transmission.
Figure 3:
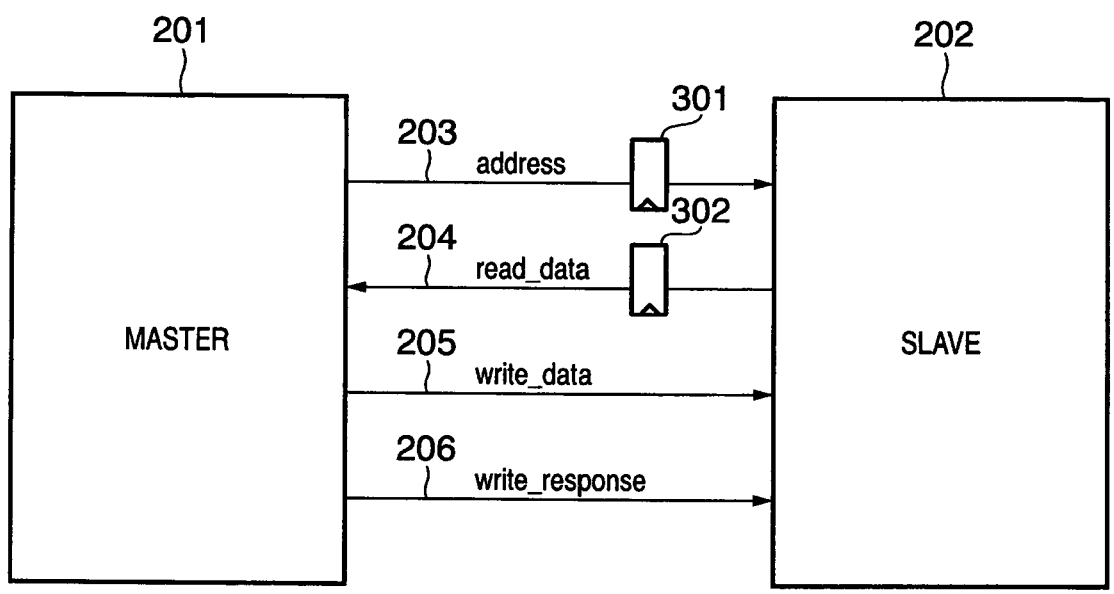
FIG. 3 is a view showing a connection example in which a register slice is inserted in the point-to-point connection shown in FIG. 2.
Figure 6:
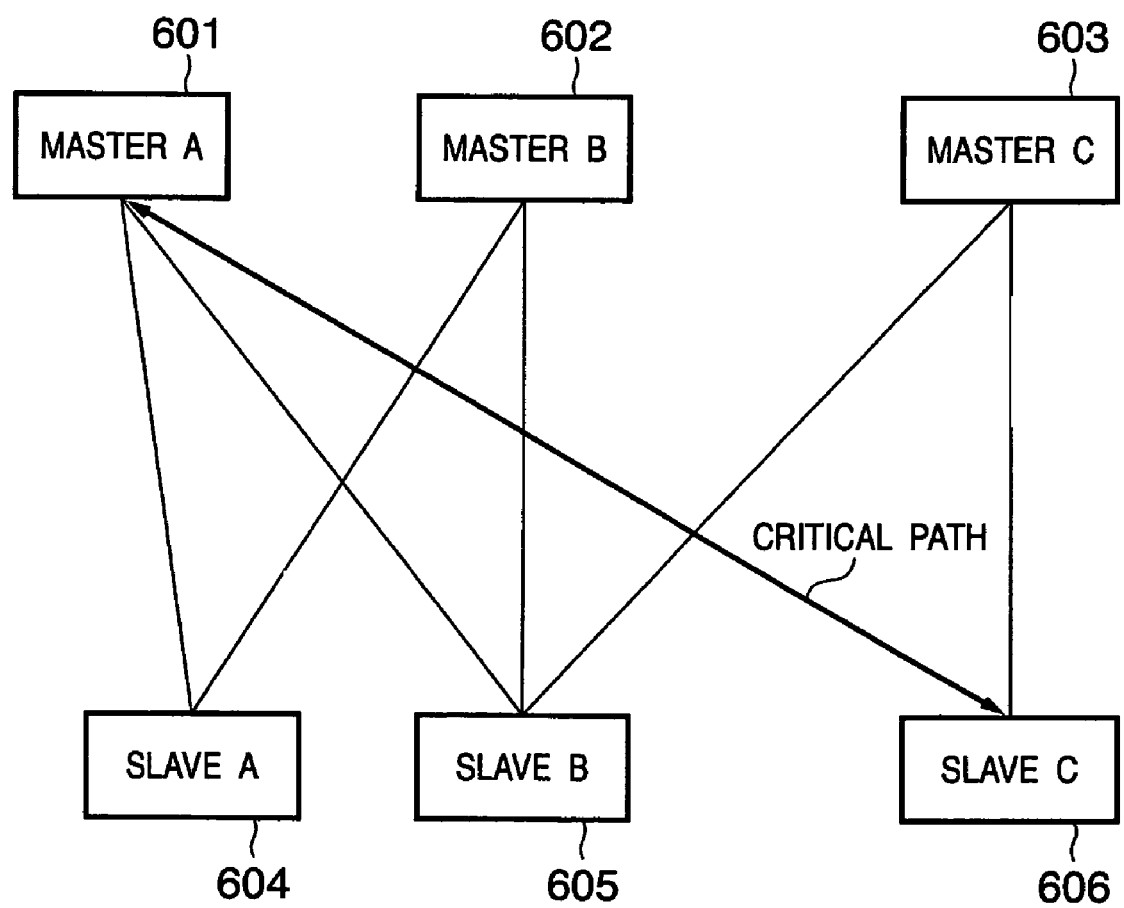
FIG. 6 is a view showing an example of the internal arrangement of a system LSI according to an embodiment.

FIG. 6 is a view showing an example of the internal arrangement of a system LSI according to an embodiment. In this example, three master devices 601 to 603 and three slave devices 604 to 606 are interconnected inside the system LSI. Also, a protocol which connects the master devices 601 to 603 and slave devices 604 to 606 is a simple common protocol (FIG. 1) using valid, data, and ready. Four types of information, i.e., address, write data, read data, and write response (FIG. 2) are communicated.

Master-slave data transfer supports burst transfer, and a maximum of 16 burst signals can be transferred. The burst transfer length is communicated as a part of data in an address information phase. When the system operates under the fastest conditions, it takes 16 cycles from the issue of an address by the master to the reception of 16-burst read data.

Assume that one system LSI of this embodiment covers products having different required performances as follows.
Product A: required transfer rate=525 MBytes/s
Product B: required transfer rate=475 MBytes/s low-power specification The relationship shown in FIG. 4 indicates that the operating frequency which satisfies a required transfer rate of 525 MBytes/s when no register slice is inserted is 130 MHz or more. In this system, therefore, design, simulation, and logic synthesis are performed using a hardware description language in a system LSI designing step, thereby laying out the system such that the masters and slaves operate at 160 MHz.

[Layout Result]

The arrangement of individual devices inside a system LSI depends on various factors such as the relationships with other functional modules and external pins, and these devices are rarely evenly arranged.

Assume that as a result of layout, the path delay of the address and read data between the master A 601 and slave C 606 is 7.8 ns. Accordingly, this path is a critical path which can operate at 120 MHz, but cannot operate at 160 MHz or more. As is also evident from FIG. 4, the target performance (a required transfer rate of 525 MBytes/s) of product A cannot be achieved at 120 MHz. Note that the timings of all other paths are ensured at 160 MHz.

Figure 7:
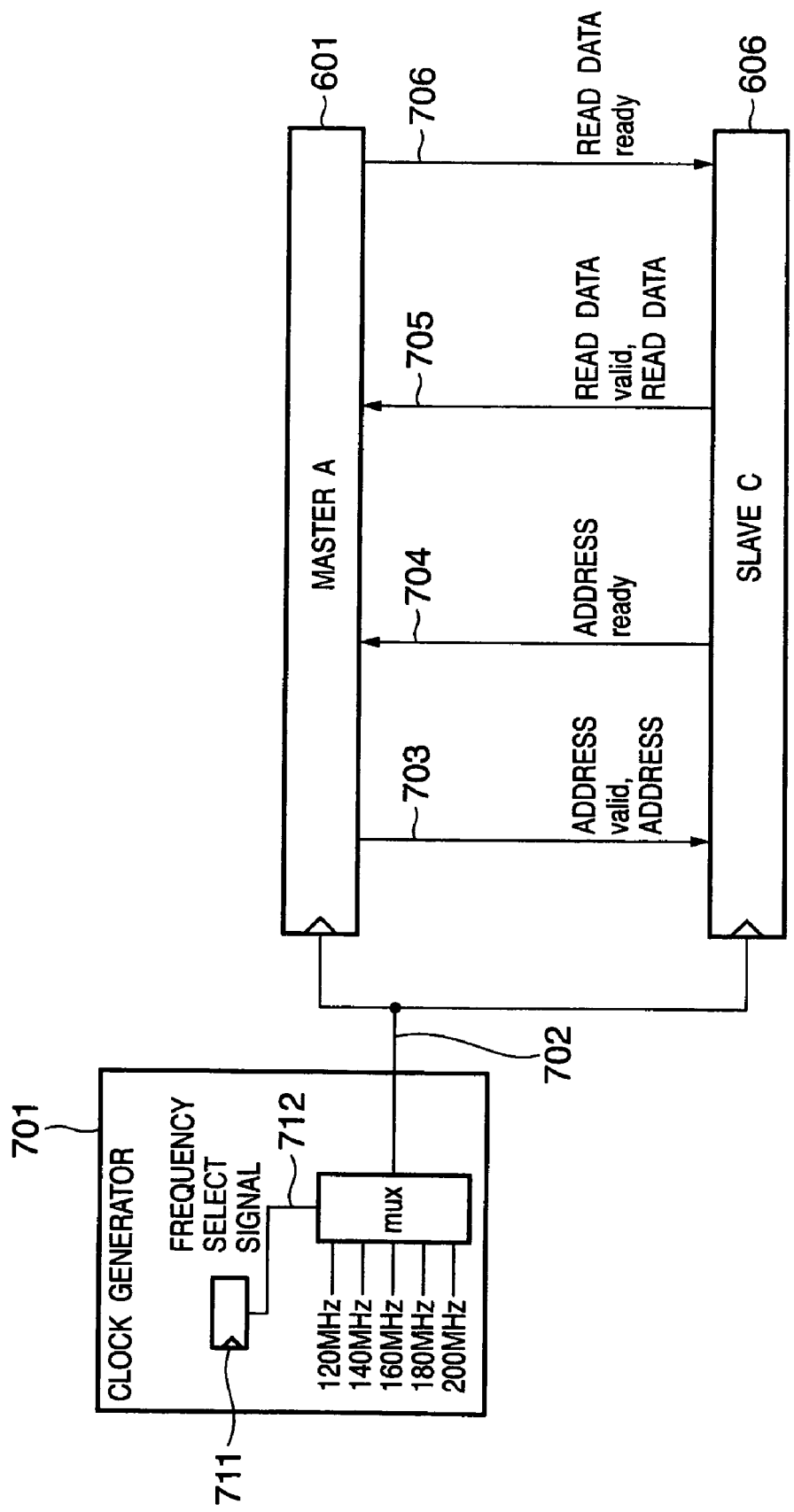
FIG. 7 is a view showing an arrangement including particularly a master A 601 and slave C 606.

FIG. 7 is a view showing an arrangement including particularly the master A 601 and slave C 606. Referring to FIG. 7, the master device 601 and slave device 606 are connected by a point-to-point connection. FIG. 7 shows only the channels of address and read data by which no timings are satisfied. A clock 702 input to the master A 601 and slave C 606 is generated by a clock generator 701, and selectable by a frequency select signal 712 of a setting register 711 from a plurality of frequency candidates (120, 140, 160, 180, and 200 MHz).

[Insertion of Register Slice/Bypass Circuit from Layout Results]

Figure 8:
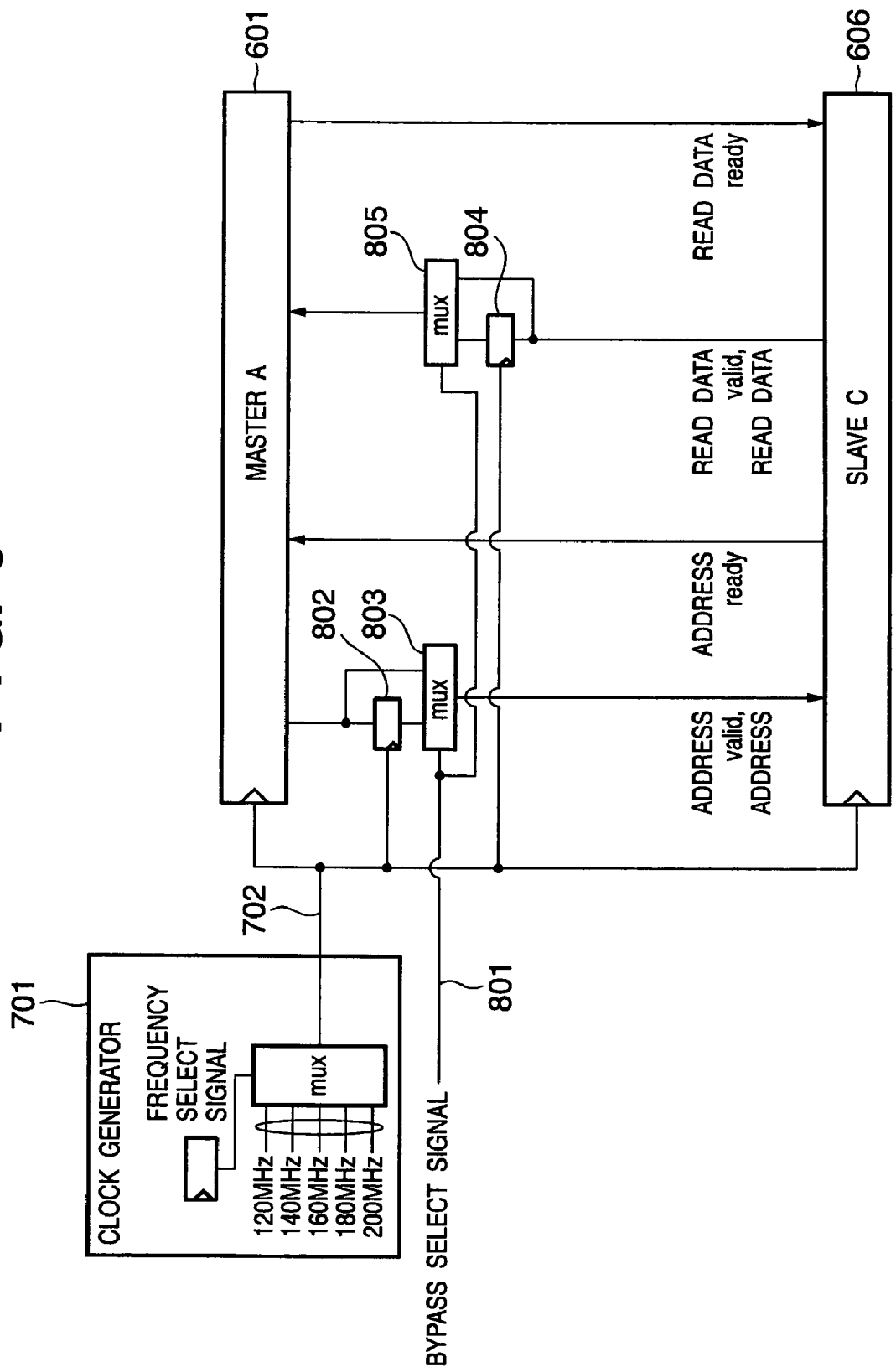
FIG. 8 is a view showing an arrangement in which a register slice and bypass circuit are inserted in a layout step.

FIG. 8 is a view showing an arrangement in which a register slice and bypass circuit are inserted in a layout step. As shown in FIG. 8, registers 802 and 804 are inserted in the layout step with respect to an address valid signal and address, and a read data valid signal and read data. At the same time, selectors 803 and 805 are inserted after this register slice to insert a circuit capable of selecting a path including the register slice, and a path not including the register slice. This selection is performed by inputting a select signal to the selectors 803 and 805 from an external pin which is previously open for this purpose.

[Relayout]

In relayout, timings are ensured at an operating frequency of not 160 MHz but 120 MHz for the path not including the register slice. Also, timings are ensured at 160 MHz for the path in which the register slice is inserted.

With this circuit configuration, it is possible to selectively use the register slice system in a 160-MHz operation, and the register slice bypass system in a 120-MHz operation. Accordingly, product A is operated at 160 MHz, and the register bypass system is used at a transfer rate of 120 MHz for product B having the required performance lower than that of product A.

Note that the performance of product B may also be satisfied by operating it at 140 or 160 MHz by using the register slice. However, the power consumption can be suppressed when the device is operated at 120 MHz without inserting the register slice.

The second embodiment of the present invention will be described in detail below with reference to the accompanying drawings.

Figure 9:
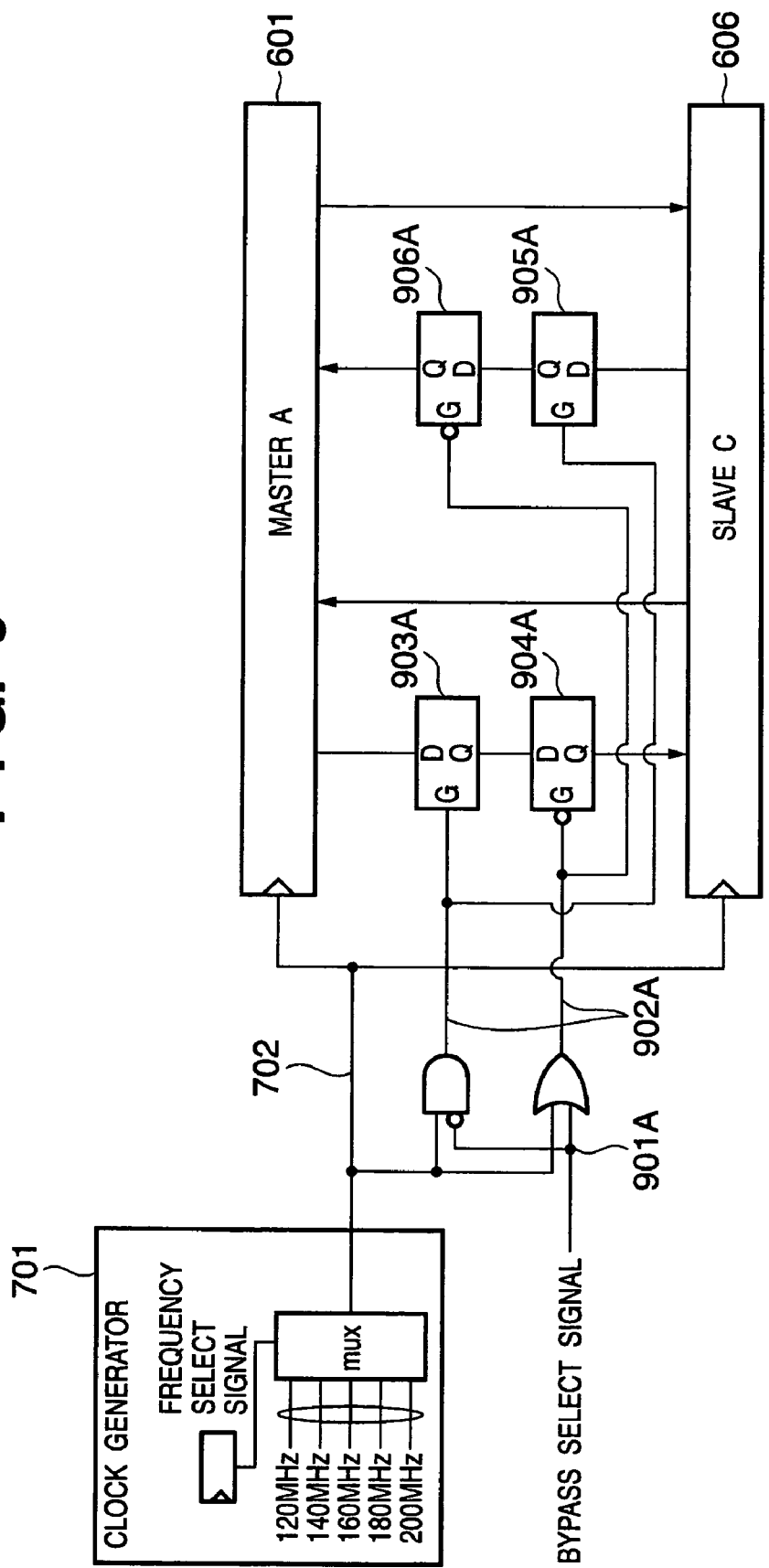
FIG. 9 is a view showing an example of an arrangement which bypasses a register slice according to the second embodiment.

FIG. 9 is a view showing an example of an arrangement which bypasses a register slice according to the second embodiment. In the second embodiment, two transparent latches are used instead of a register slice and multiplexer. More specifically, as shown in FIG. 9, low through-high latches 903A and 905A and high through-low latches 904A and 906A are combined. In FIG. 9, reference numeral 903A denotes an address channel through latch (low through-high latch); 904A, an address channel through latch (high through-low latch); 905A, a read data channel through latch (low through-high latch); and 906A, a read data channel through latch (high through-low latch).

The gate input of each transparent latch receives a signal 902A formed by masking a clock 702, which is supplied from a clock generator 701 to a master A 601 and slave C 606, by a bypass select signal 901A for selecting whether to bypass the register slice.

In this arrangement, therefore, in the register slice system to be operated at a high speed, a clock equivalent to the clock signal supplied to the master A 601 and slave C 606 is input to the gate input of the latch. On the other hand, when the system is to be operated at a low speed by bypassing the register slice, the latch is set in a through state. Also, as in the first embodiment (FIG. 8), the bypass select signal 901A is connected to an external input pin.

Note that in the above embodiments, the bypass select signal is connected to the external pin. However, the bypass select signal may also be the flip-flop output of the setting register. In this case, whether to insert the register slice depends upon the layout result, so a control register is prepared in the stage of front end development.

Note also that the number of register slice stages is 1 in the above embodiments, but it is naturally possible to insert two or more register stages depending on the result of layout. The present invention is applicable in this case as well. Furthermore, although the present invention is applied to only one master-slave connection in the above embodiments, the present invention is also applicable to a plurality of connections.

The third embodiment according to the present invention will be explained in detail below with reference to the accompanying drawings.

Assume that one system LSI of this embodiment also covers products different in required performance as follows.

Product A: required transfer rate=525 MBytes/s

Product B: required transfer rate=475 MBytes/s low-power specification

Figure 4:
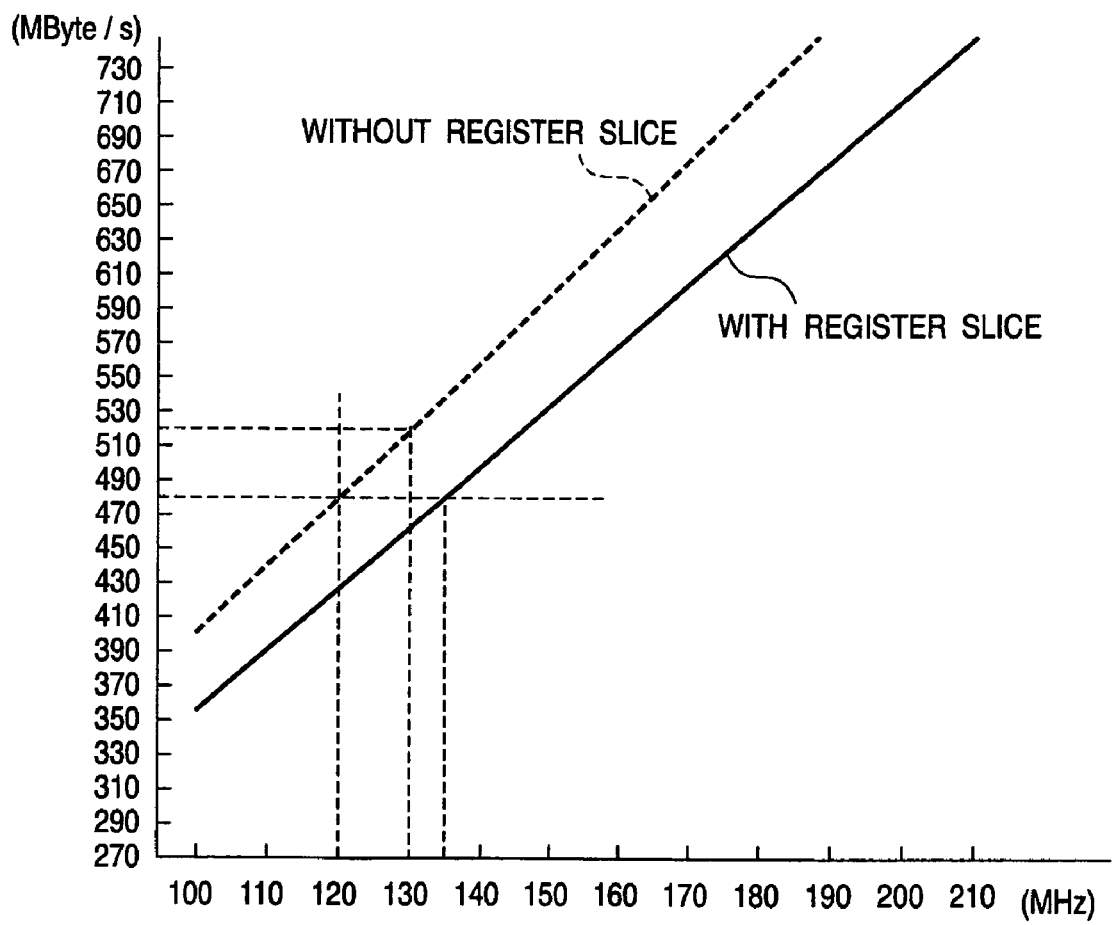
FIG. 4 is a graph showing the relationship between the operating frequency and transfer rate when 16-burst transfer is performed.
Figure 5:
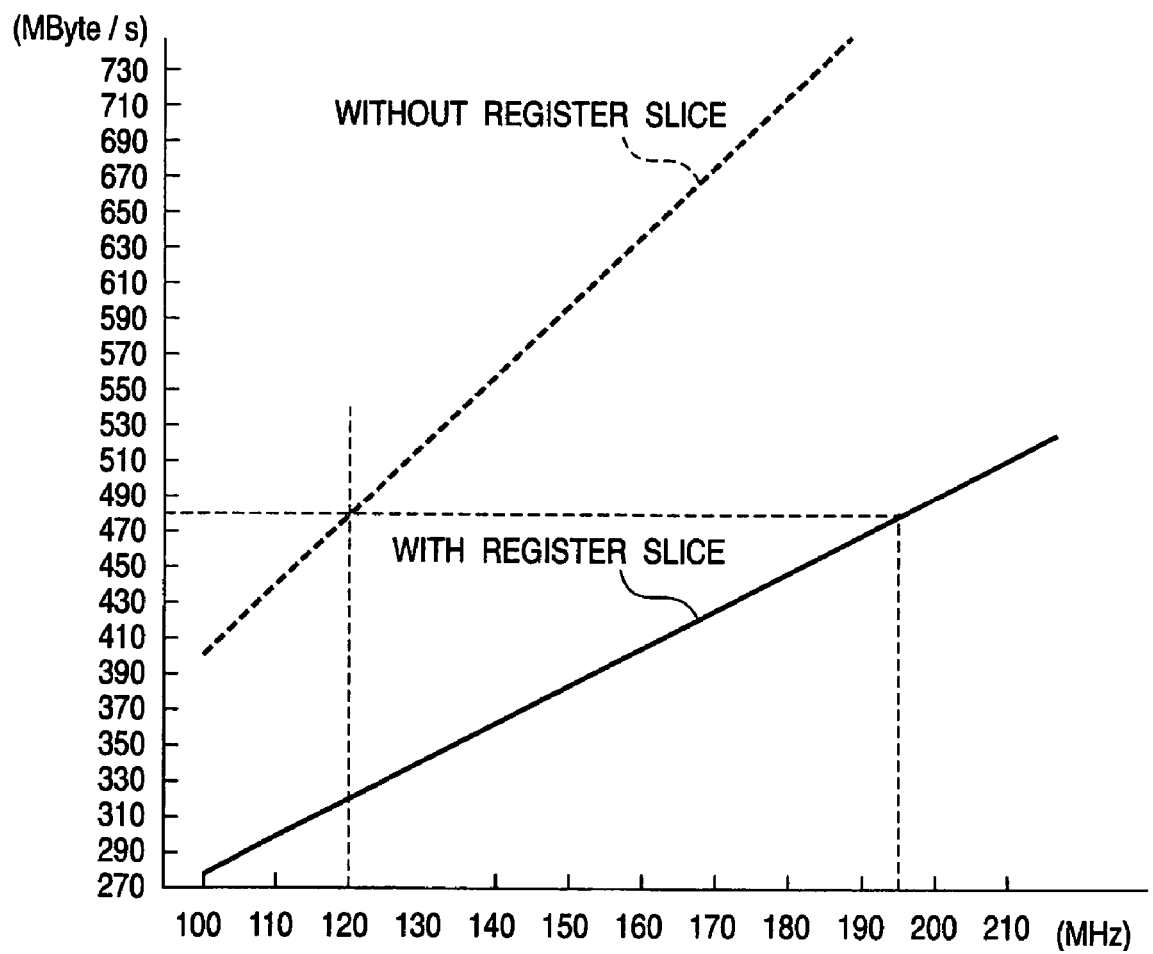
FIG. 5 is a graph showing the relationship between the operating frequency and transfer rate when 4-burst transfer is performed.

The relationship shown in FIG. 4 reveals that the operating frequency which satisfies a required transfer rate of 525 MBytes/s when no register slice is inserted is 130 MHz or more. In this system, therefore, design, simulation, and logic synthesis are performed using a hardware description language in a system LSI designing step, thereby laying out the system such that masters and slaves operate at 160 MHz.

Assume that as a result of layout, the path delay of the address and read data between a master A 601 and slave C 606 is 7.8 ns in this embodiment as well. Accordingly, this path is a critical path which can operate at 120 MHz, but cannot operate at 160 MHz or more. As is also evident from FIG. 4, the target performance of product A cannot be achieved at 120 MHz. Note that the timings of all other paths are ensured at 160 MHz.

[Insertion of Register Slice/Bypass Circuit from Layout Results]

On the basis of the layout results and target performances as described above, the circuit is changed as shown in FIG. 10 so that timings can be assured;

FIG. 10 is a view showing the operating conditions after the relayout. Referring to FIG. 10, "o" indicates that the operation is possible, and "x" indicates that the operation is impossible.

Figure 11:
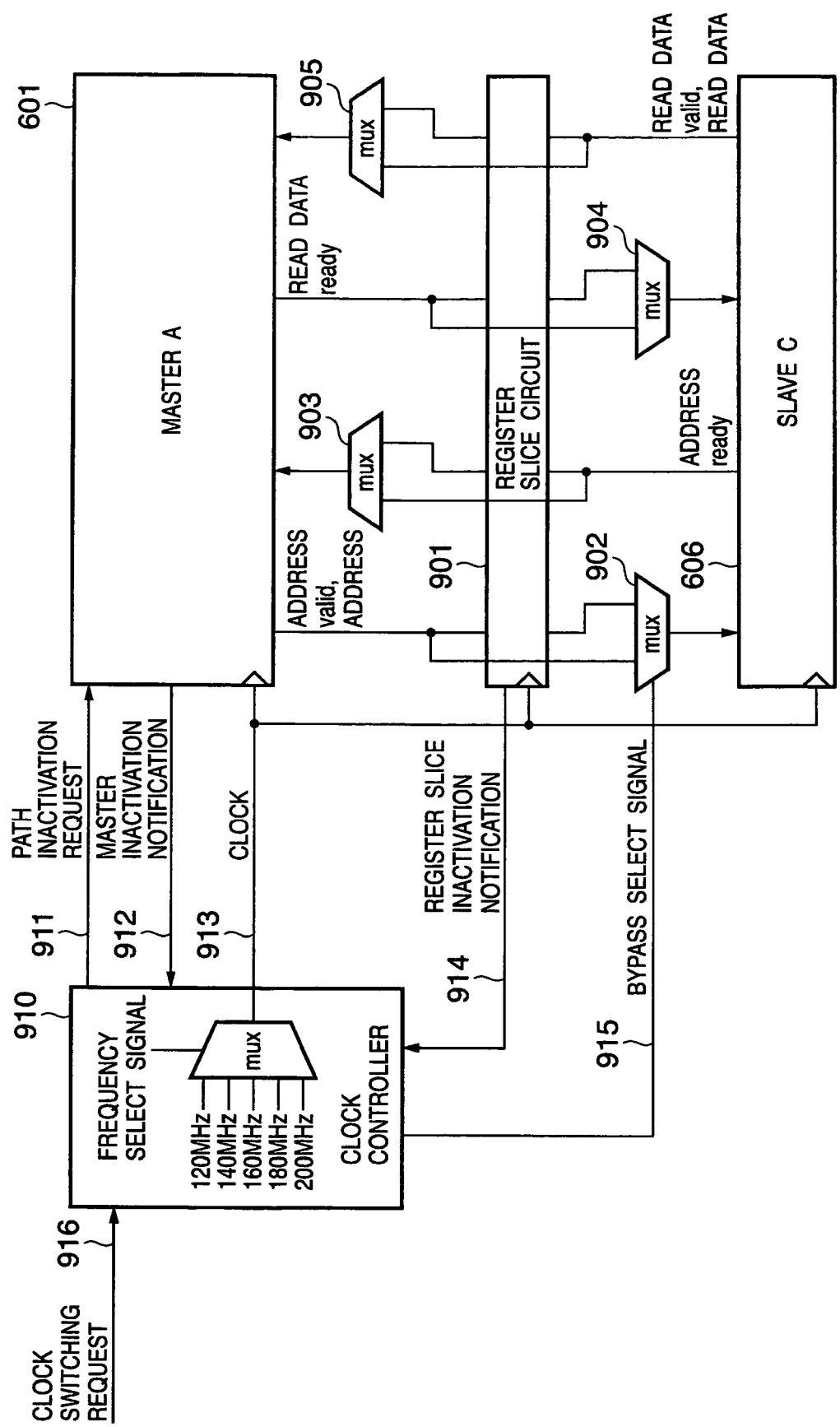
FIG. 11 is a view showing an arrangement in which a register slice and bypass circuit are inserted in a layout step.

FIG. 11 is a view showing an arrangement in which a register slice and bypass circuit are inserted in the layout step. As shown in FIG. 11, a register slice circuit 901 is inserted in the layout step with respect to an address signal and read data signal. The arrangement of the register slice circuit 901 changes in accordance with, e.g., the number of register slices to be inserted, or the place where the register slice is to be inserted. For example, two register slices are inserted into a place where the path delay is large, or one register slice is inserted into a valid (data) path because a ready path satisfies the required timing. That is, the arrangement changes in accordance with the required level.

A clock 913 input to the register slice circuit 901 is output from a clock controller 910 (to be described later), and is also input to the master device 601 and slave device 606. Note that the clock controller 910 will be described in detail later with reference to FIG. 13.

Figure 12:
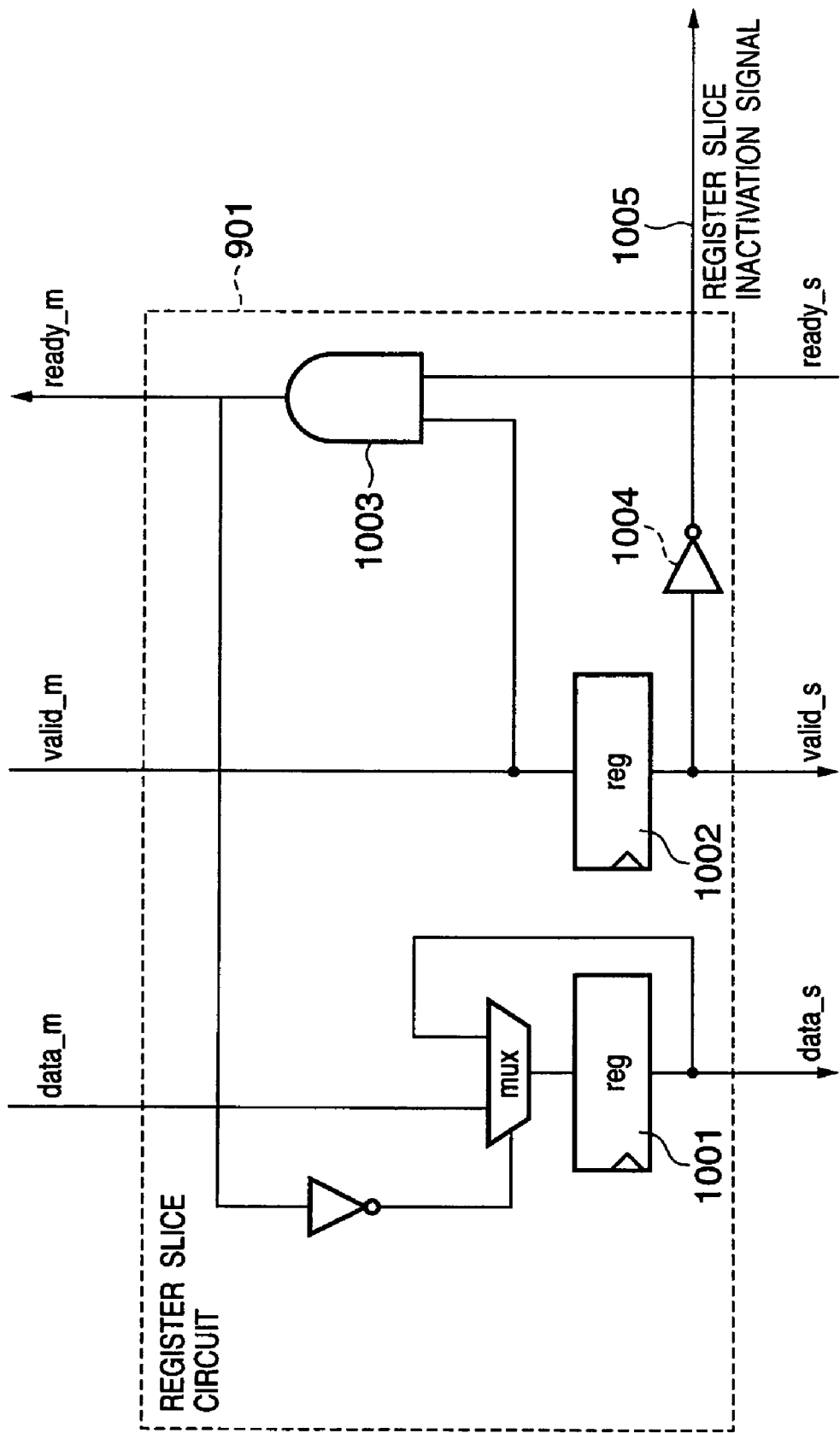
FIG. 12 is a view showing an example when one register slice is inserted in only valid (data)

FIG. 12 is a view showing an example of an arrangement in which one register slice is inserted in only valid (data). Generally, the register slice circuit 901 is not simply formed by a sequential circuit alone, but additionally includes a combinational circuit in order to process a ready signal. This applies to the example shown in FIG. 12; when one register slice is inserted in valid (data), not only registers 1001 and 1002 but also a combinational circuit (e.g., an AND gate 1003) are included. In addition, an inverted signal obtained by inverting a valid signal by an inverter 1004 after the insertion of the register slice is output as a register slice inactivation signal 1005.

Referring back to FIG. 11, in addition to the register slice circuit 901, selectors 902, 903, 904, and 905 are inserted after the register slice circuit 901. This makes it possible to select a path including the register slice circuit 901 and a path not including the register slice circuit 901.

Figure 13:
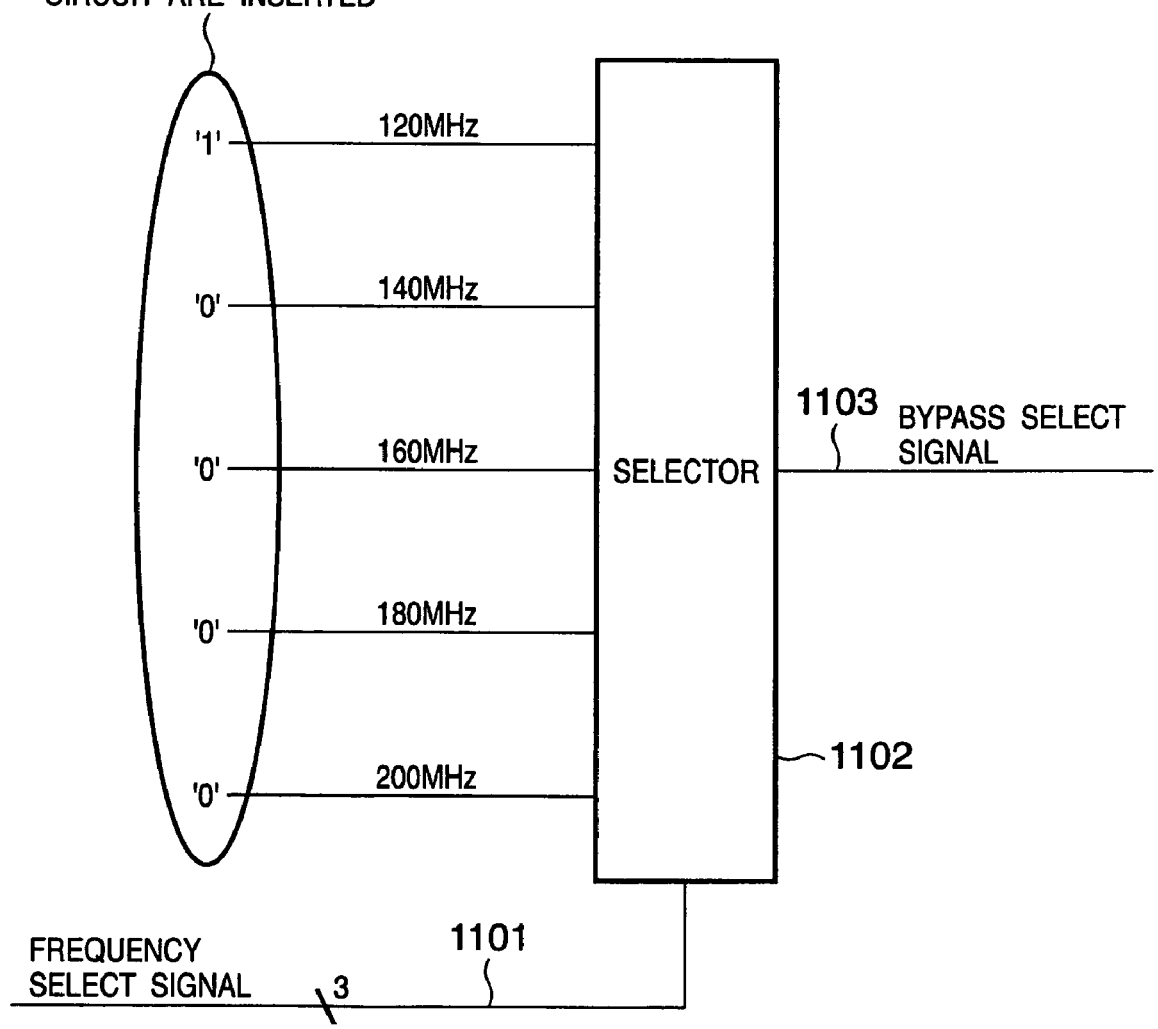
FIG. 13 is a view showing the allocation of frequencies in a clock controller 910 after a register slice and bypass circuit are inserted.

A bypass select signal 915 for this purpose is a signal 1103 output from the output port of a selector circuit 1102 in the clock controller 910 shown in FIG. 13. Each of input candidates of the selector circuit 1102 corresponds to the polarity of a bypass select signal for each frequency candidate, and is given a value corresponding to a system which can operate at the frequency. These input candidates are allocated after the register slice and bypass circuit are inserted. To satisfy the timings shown in FIG. 10, the values are determined such that "1" is output so as to bypass the register slice at 120 MHz, and "0" is output so that signals propagate via the register slice system at other frequencies.

In this manner, it is possible to change the frequency and generate an appropriate bypass select signal 1103 corresponding to the frequency at the same time in accordance with a frequency select signal 1101. Accordingly, the user need not take the relationship between the operating frequency and bypass selection/non-selection into consideration any longer, so wrong settings by which the operation is impossible can be prevented.

With this circuit configuration, it is possible to selectively use the register slice system in a 160-MHz operation, and the register slice bypass system in a 120-MHz operation. Accordingly, product A is operated at 160 MHz, and the register bypass system is used at a transfer rate of 120 MHz for product B having the required performance lower than that of product A.

Note that the performance of product B may also be satisfied by operating it at 140 or 160 MHz by using the register slice. However, the power consumption can be suppressed when the device is operated at 120 MHz without inserting the register slice.

Also, the circuit is configured such that the bypass select signal is generated to uniquely select the register slice system or register slice bypass system in accordance with the operating frequency. Therefore, the user need only note the frequency, and this improves the convenience for the user.

In this example, the clock frequencies are switched in accordance with the product. However, the clock frequencies may also be switched in accordance with the operation mode of the product. When the switching is to be performed in accordance with the operation mode or the like, the timing at which the operating frequency switching including bypass selection is required is not necessarily the timing at which no point-to-point communication is performed. It is naturally impossible to switch the register slice system and register slice bypass system during communication. On the other hand, it is troublesome for the user to control the operating frequency switching while checking whether point-to-point communication is being executed.

Accordingly, to allow the user to safely switch the operating frequencies without checking whether point-to-point communication is presently being performed, the clock controller 910 performs handshake with the master device 601 or register slice circuit 901.

As minimum necessary signals of this handshake, FIG. 11 shows a bus inactivation request 911, master inactivation notification 912, and register slice inactivation notification 914. The bus inactivation request 911 is a signal which is output from the clock controller 910 to the master device 601. The master inactivation notification 912 is a signal which is output from the master device 601 to the clock controller 910.

The register slice inactivation notification 914 is a signal which is output from the register slice circuit 901 to the clock controller 910.

An operation by which the clock controller 910 performs handshake with the master device 601 or register slice circuit 901 by using the above-mentioned signals, and performs bypass switching by using the bypass select signal 915 will be explained below with reference to FIGS. 14 and 15.

Figure 14:
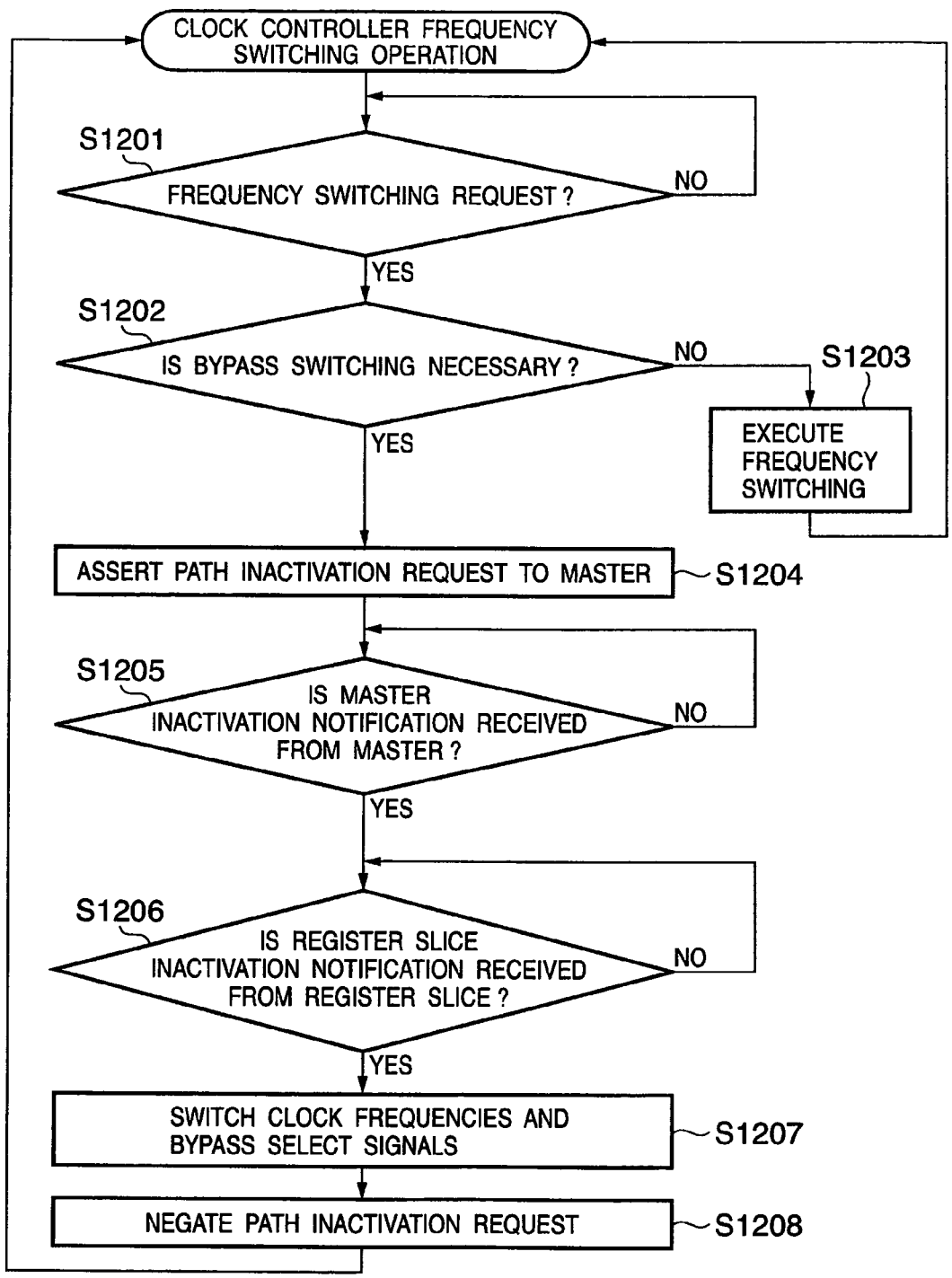
FIG. 14 is a flowchart showing a frequency switching operation in the clock controller 910.

FIG. 14 is a flowchart showing the frequency switching operation performed by the clock controller 910. The clock controller 910 may also be formed by a memory which stores a program represented by the flowchart shown in FIG. 14, and a computer which reads out the program stored in this memory and performs the operation indicated by the flowchart shown in FIG. 14.

First, if the clock controller 910 receives a clock switching request 916 for switching the operating frequencies from the user in step S1201, the flow advances to step S1202. In step S1202, the clock controller 910 determines whether this operating frequency switching requires bypass switching of the register slice circuit 901. This determination process determines that no bypass switching is necessary, if the operating frequency is to be switched from, e.g., 140 MHz to 200 MHz, or 180 MHz to 160 MHz. If the clock controller 910 determines that no bypass switching is necessary, the flow advances to step S1203, and the operating frequencies are immediately switched.

If the operating frequency switching requires bypass switching, e.g., if the operating frequency is to be switched from 120 MHz to 160 MHz or from 200 MHz to 120 MHz, the flow advances to step S1204, and the clock controller 910 performs the handshake described above. First, in step S1204, the clock controller 910 outputs the bus inactivation request 911 to the master device 601. In step S1205, the clock controller 910 detects the master inactivation completion notification 912 which is transmitted from the master device 601 as a result of the bus inactivation. Additionally, in step S1206, the clock controller 910 detects the register slice inactivation completion notification 914 transmitted from the register slice circuit 901.

When the notifications 912 and 914 are detected, the flow advances to step S1207, and the clock controller 910 switches the clock frequencies and the bypass select signals 1103 by using the frequency select signal 1101. In step S1208, the clock controller 910 negates the bus inactivation request 911 which has been output to the master device 601, thereby completing the processing.

Figure 15:
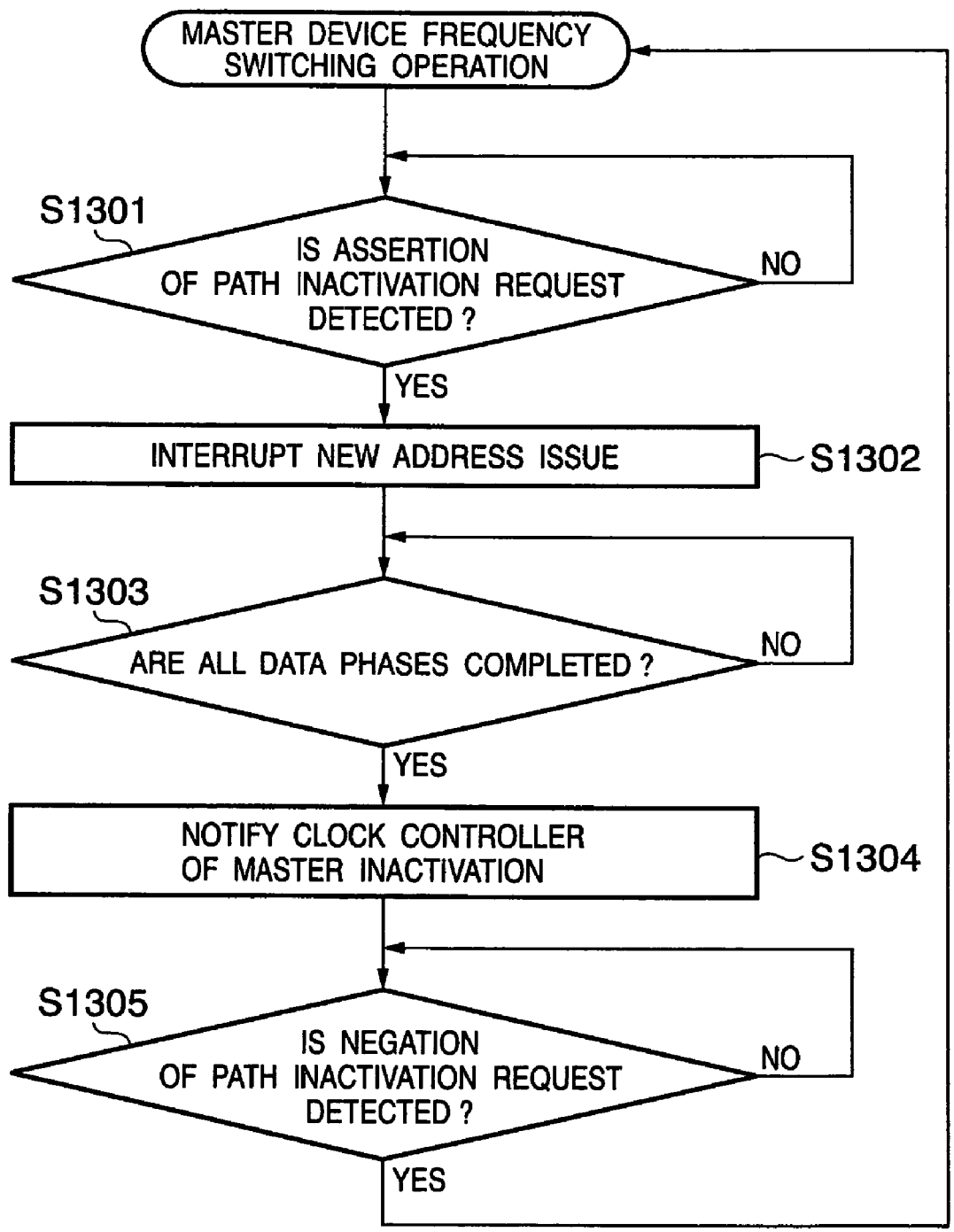
FIG. 15 is a flowchart showing a frequency switching operation in the master device 601.
Figure 16:
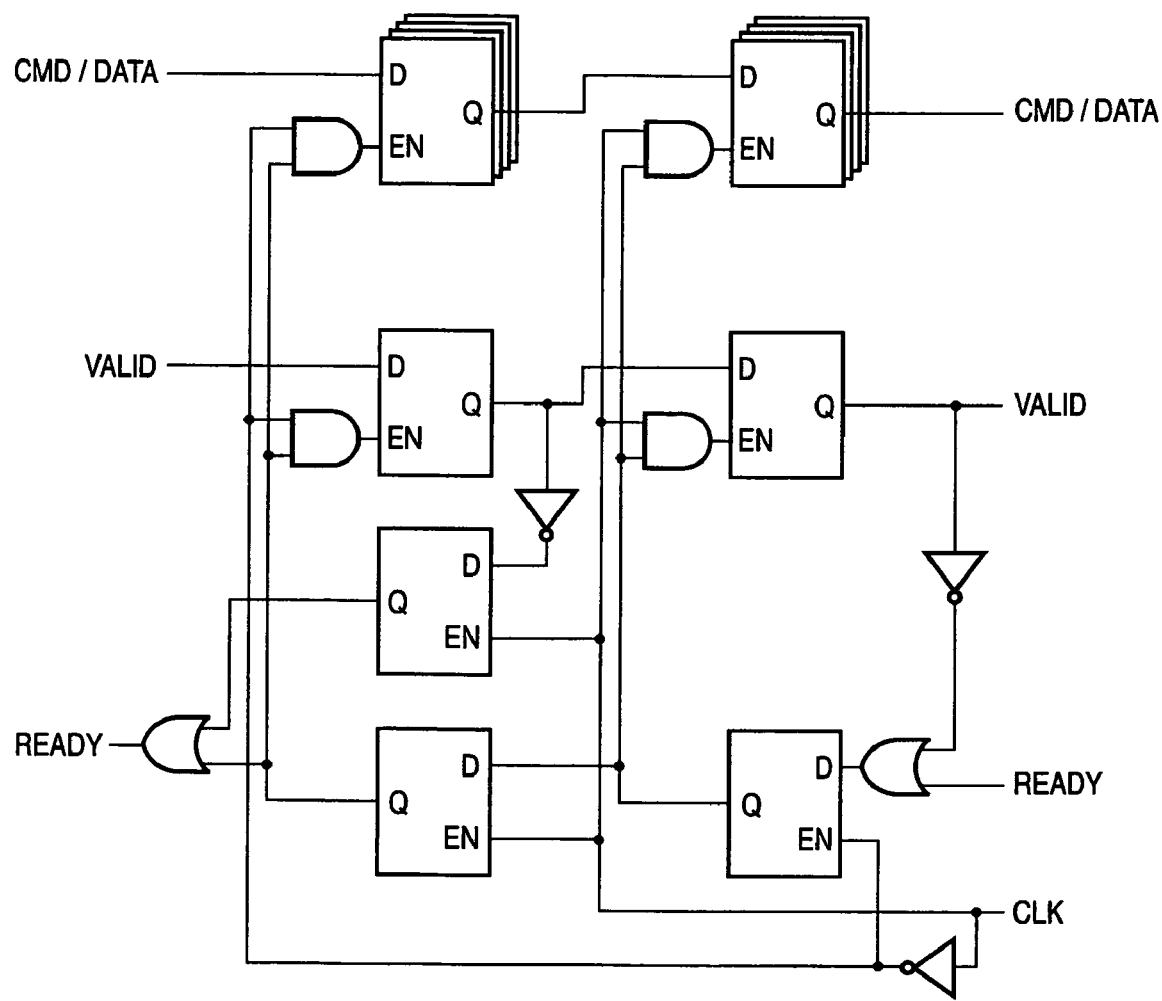
FIG. 16 is a view showing an example of an arrangement in which a register slice is formed by half-latches.
Figure 17:
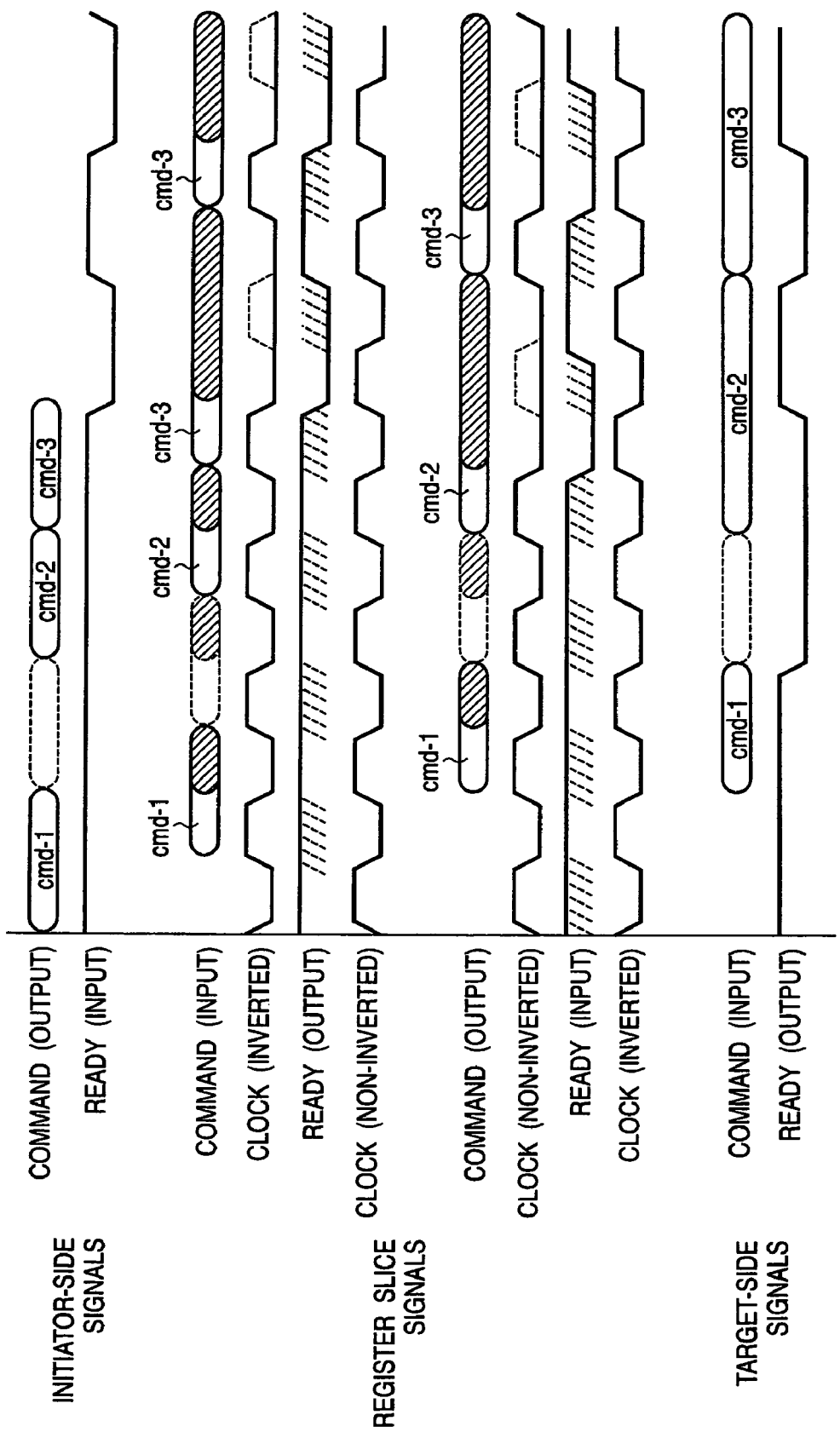
FIG. 17 shows a timing chart of the register slice shown in FIG. 1.

FIG. 15 is a flowchart showing the frequency switching operation by the master device 601. The master device 601 may also be formed by a memory which stores a program represented by the flowchart shown in FIG. 15, and a computer which performs the operation indicated by the flowchart shown in FIG. 15.

First, if the master device 601 detects the bus inactivation request 911 output from the clock controller 910 in step S1301, the flow advances to step S1302, and the master device 601 interrupts new address issue. In step S1303, the master device 601 waits until all data phases are completed for already issued addresses.

If all the data phases are completed after that, the flow advances to step S1304, and the master device 601 outputs, to the clock controller 910, the master inactivation notification 912 indicating that the bus inactivation is completed. The master device 601 waits until the bus inactivation request 911 from the clock controller 910 is negated. If the master device 601 detects in step S1305 that the bus inactivation request 911 is negated, the master device 601 changes to a normal state, and becomes able to issue a new address.

Note that the register slice inactivation notification 914 output from the register slice circuit 901 can be generated in accordance with whether the valid signal of the register slice is inactive in the subsequent stage of the register slice. If a plurality of register slice stages are inserted for the valid signal, the valid signal need only be NORed in each stage.

Note also that the number of register slice stages is 1 in this embodiment, but it is naturally possible to insert two or more register stages depending on the result of layout. The present invention is applicable in this case as well. Furthermore, although the present invention is applied to only one master-slave connection in this embodiment, the present invention is of course also applicable to a plurality of connections.

In this embodiment, it is possible, by forming the register slice system and register slice bypass system, to prevent deterioration of the performance by the increase in latency caused by the addition of the register slice, and select an optimum operating frequency which is not an over specification with respect to the required performance. It is also possible to obviate the need for the user to take the relationship between the operating frequency and bypass selection/non-selection into consideration, thereby preventing wrong settings by which the operation is impossible. Furthermore, the operating frequency change request can be processed at any arbitrary timing from the CPU. Accordingly, switching to a system having an optimum performance can be safely performed.

The fourth embodiment according to the present invention will be described in detail below with reference to the accompanying drawings.

Figure 18:
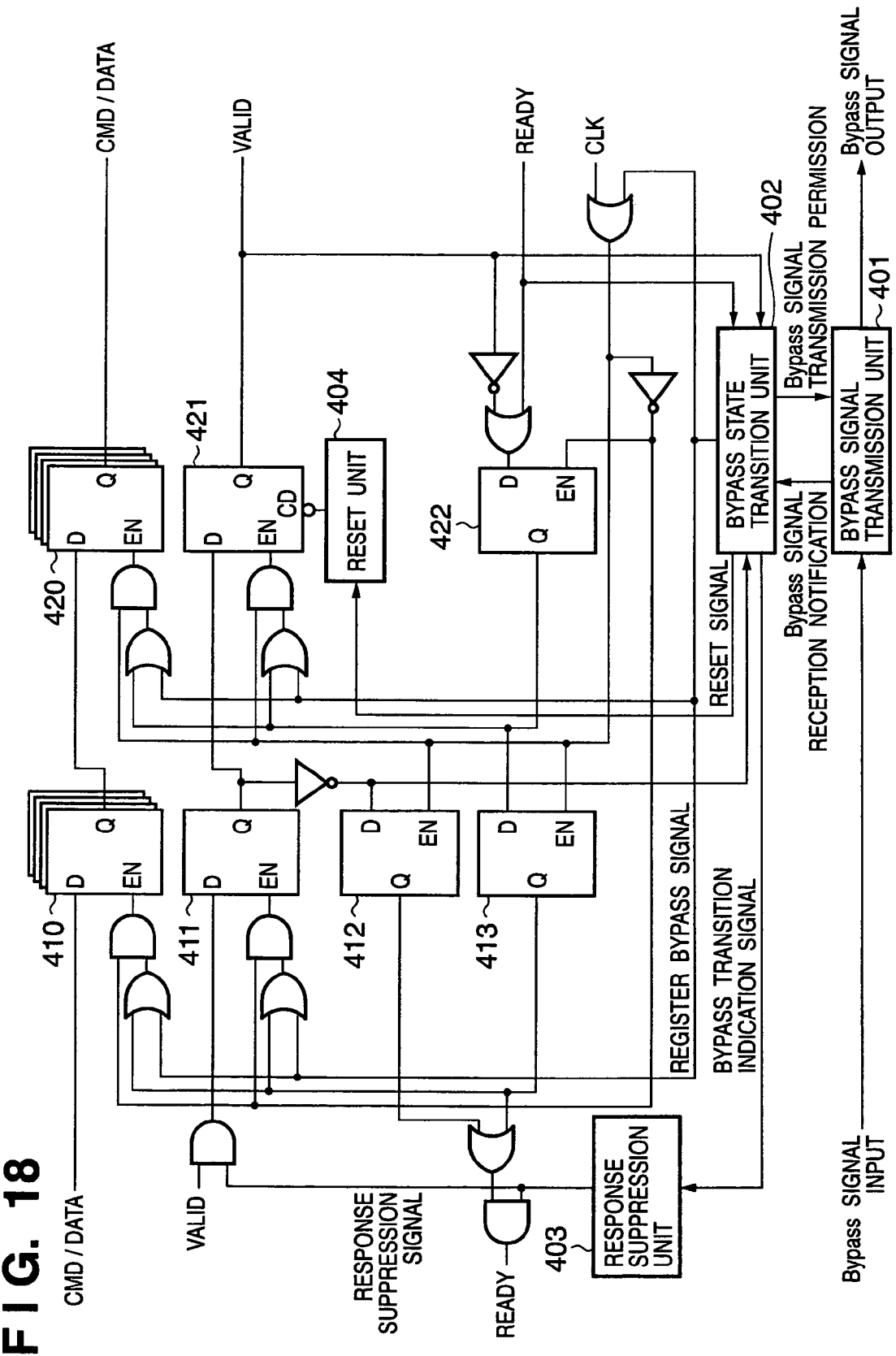
FIG. 18 is a view showing the arrangement of the register slice of the embodiment.

FIG. 18 is a view showing the arrangement of a register slice according to this embodiment. In FIG. 18, reference numeral 401 denotes a bypass signal transmission unit which receives a bypass signal from an initiator (e.g., a master or another register slice), and transmits the signal to a target (e.g., a slave or another register slice). Note that the bypass signal transmission unit 401 does not simply transmit the bypass signal. That is, the bypass signal transmission unit 401 has a function of notifying a bypass state transition unit 402 (to be described later) of the reception of the bypass signal, and transmitting the bypass signal after the transmission of the bypass signal is permitted by the bypass state transition unit 402.

The bypass state transition unit 402 is a state machine which controls transition between a bypass state and non-bypass state. When receiving the bypass signal reception notification from the bypass signal transmission unit 401, the bypass state transition unit 402 changes the internal state in accordance with the value of the signal. Note that details of this state transition will be described later with reference to FIG. 19.

Reference numeral 403 denotes a response suppression unit. When receiving a bypass transition indication signal from the bypass state transition unit 402, the response suppression unit 403 holds a reception response signal (ready signal) in a deasserted state by a response suppression signal.

Reference numeral 404 denotes a reset unit. When receiving a reset signal from the bypass state transition unit 402, the reset unit 404 resets a half-latch 421 (to be described later).

Half-latches 410 to 413 and 420 to 422 are transparent when the EN terminal is 1, and hold output data when the EN terminal is 0. In particular, the half-latch 421 has a reset terminal, and is reset by the reset signal from the reset unit 404.

Figure 19:
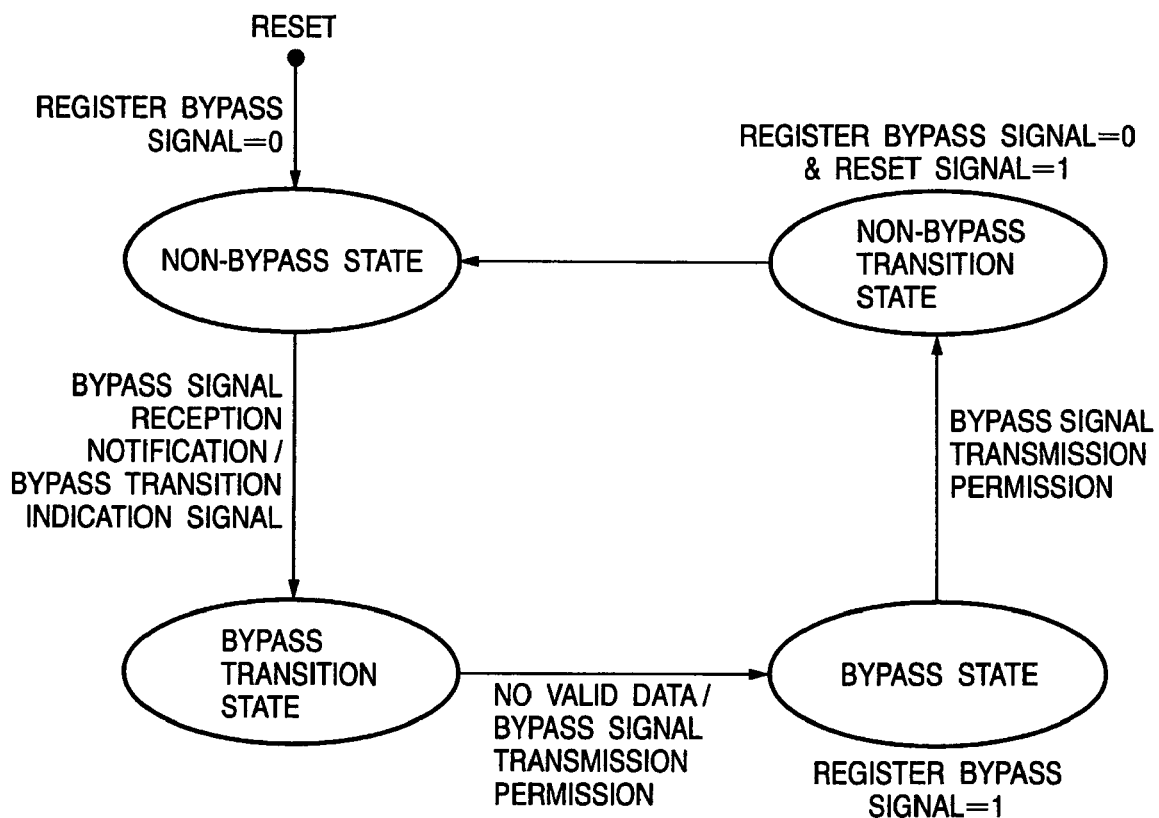
FIG. 19 is a view showing the state transition in a bypass state transition unit 402 shown in FIG. 4.

FIG. 19 is a view showing the state transition in the bypass state transition unit 402 shown in FIG. 18. First, the transition from the non-bypass state to the bypass state will be explained.

In this embodiment, the initial state is the non-bypass state. If a bypass signal reception notification is received in this state and the signal designates the transition from the non-bypass state to the bypass state, the bypass state transition unit 402 changes to a bypass transition state. During this state, the bypass state transition unit 402 keeps asserting a bypass transition indication signal to the response suppression unit 403. When this signal is asserted, the response suppression unit 403 sets a response suppression signal as its output signal to "0". Consequently, a ready signal to the initiator changes to "0", and a valid signal from the initiator is masked, so no new valid data is input any longer.

Then, the bypass state transition unit 402 waits until the conditions that the valid signal held in the half-latch 411 is "0", the valid signal held in the half-latch 421 is "0" or "1", and the ready signal from the target is "1" hold. If the conditions hold and there is no more valid data held inside the system, the state changes to the bypass state. Simultaneously, the bypass state transition unit 402 gives bypass signal transmission permission to the bypass signal transmission unit 401. During this state, the bypass state transition unit 402 keeps asserting a register bypass signal. The register bypass signal is a signal which fixes the signal value at the EN terminal of all the half-latches to "1". This makes all the half-latches transparent. As a consequence, the register slice is bypassed.

The transition from the bypass state to the non-bypass state will be explained below.

If a bypass signal reception notification is received in the bypass state and the signal designates the transition from the bypass state to the non-bypass state, the bypass state transition unit 402 changes to the non-bypass transition state. At the same time, the bypass state transition unit 402 gives bypass signal transmission permission to the bypass signal transmission unit 401. In this state, the register slice proceeds to the non-bypass state, and the bypass state transition unit 402 deasserts the register bypass signal described above, and asserts the reset signal to the reset unit 404. Since this state unconditionally changes to the non-bypass state, the reset signal is asserted during only one cycle.

By taking a system shown in FIG. 20 as an example, the operation of the register slice and the transition between the bypass state and non-bypass state will be explained in more detail below with reference to a timing chart shown in FIG. 21.

Figure 20:
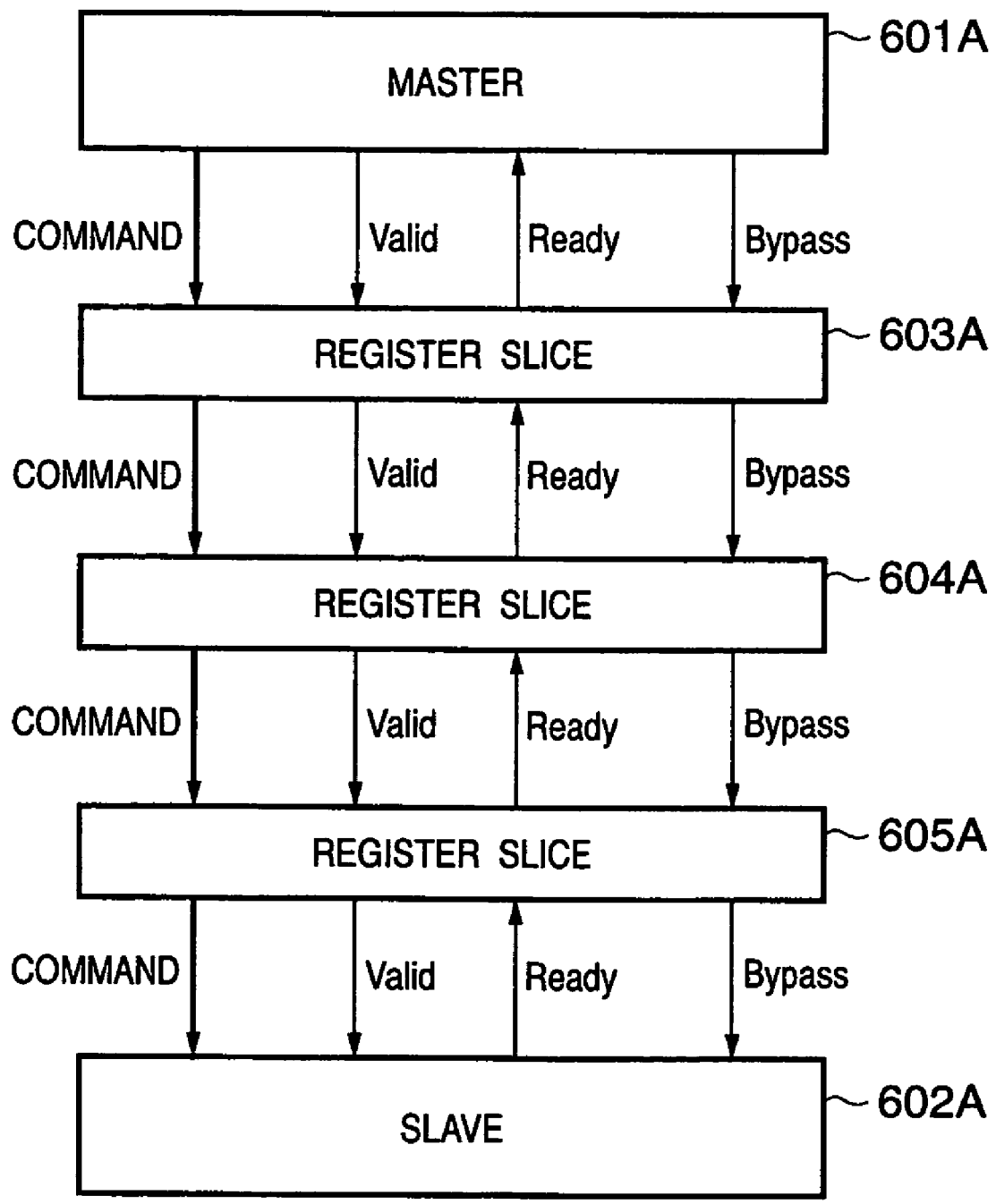
FIG. 20 is a view showing an example of the system configuration of the embodiment.
Figure 21:
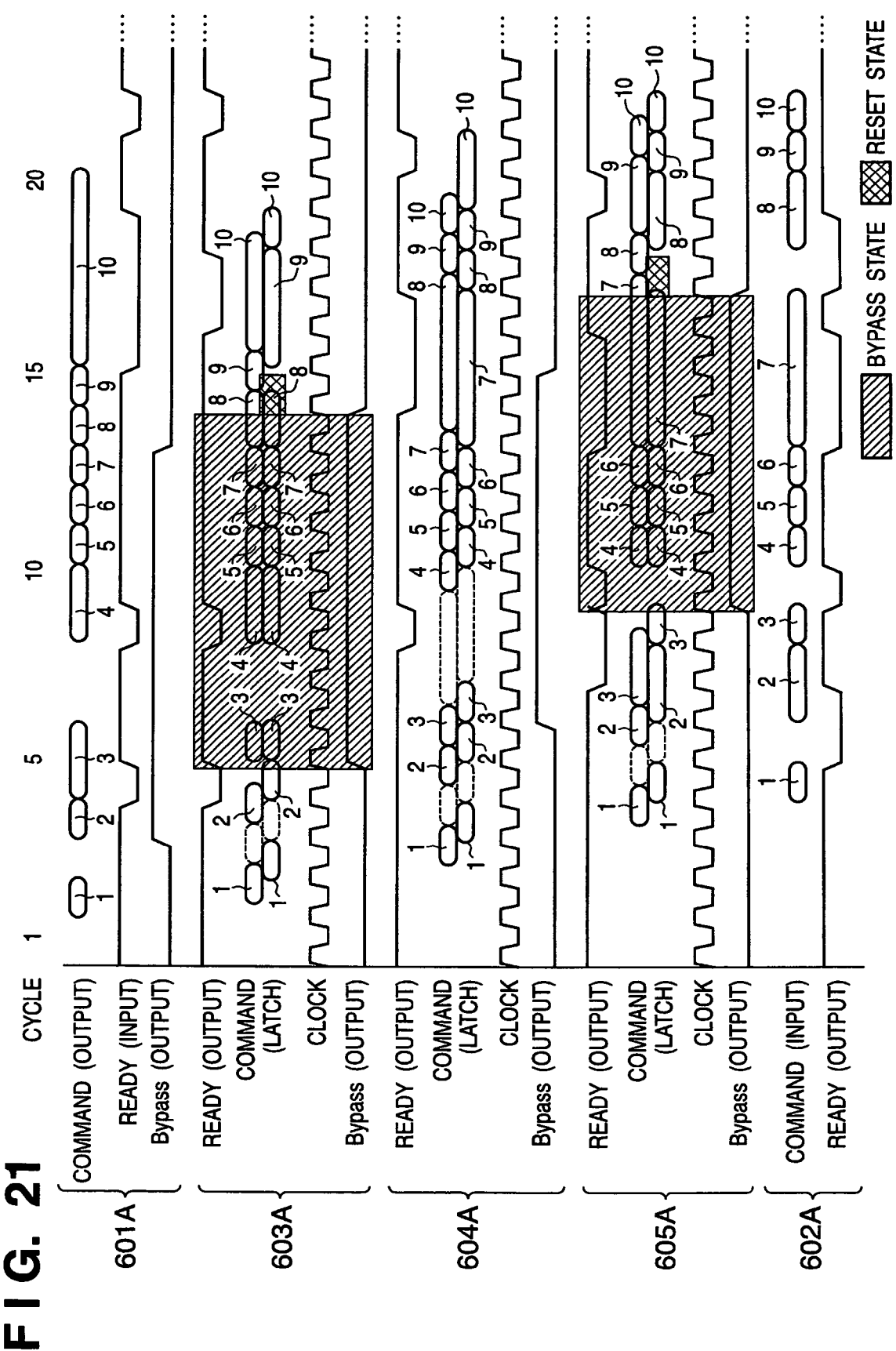
FIG. 21 is a view showing examples of the operation timings of the system of the embodiment.

FIG. 20 is a view showing an example of the configuration of a system according to this embodiment. As shown in FIG. 6, three register slices 603A, 604A, and 605A are inserted between a master 601A and slave 602A. The bypass state and non-bypass state of the register slices 603A and 605A can be switched. The register slice 604A is always in the non-bypass state. A bypass signal input from the initiator side is transmitted to the target side after being delayed by one cycle.

For the sake of simplicity, the timing chart shown in FIG. 21 will be explained by taking only a command channel from the master to the slave as an example.

First, a case in which the system operating frequency is changed from a high frequency to a low frequency will be explained. In the first cycle shown in FIG. 21, all the register slices 603A to 605A are operating in the non-bypass state. When the system operating frequency is switched to a low frequency, the master 601A asserts a bypass signal in cycle 3 in order to switch the register slices 603A and 605A to the bypass state.

When receiving the bypass signal, the register slice 603A deasserts a ready signal in cycle 4 in accordance with the state transition shown in FIG. 19. Then, when handshake with the register slice 604A is established at the end of cycle 4, the register slice 603A proceeds to the bypass state in cycle 5, and asserts the bypass signal output.

In cycle 5, the register slice 604A also receives the bypass signal. Since, however, the register slice 604A holds the non-bypass state, it asserts the bypass signal output in cycle 6 immediately after cycle 5, and the rest of the operation remains the same.

In cycle 6, the register slice 605A receives the bypass signal. Like the register slice 603A, the register slice 605A so operates as to deassert the ready signal in cycle 7 in accordance with the state transition shown in FIG. 19.

Note that cycle 7 is a cycle in which the ready signal is originally deasserted by a normal handshake operation of the register slice. That is, at the beginning of cycle 7 after the reception of the bypass signal, the register slice 605A holds valid commands (cmd-2 and cmd-3) of two stages.

In cycles 7 and 8, two handshakes are established between the register slice 605A and slave 602A, so there is no more valid command held in the register slice 605A. In cycle 9, the register slice 605A changes to the bypass state, and asserts the bypass signal output.

It should be noted that when the frequency is to be lowered, the register slice satisfies timing limitations between paths regardless of whether the state is the bypass state or non-bypass state. That is, of a series of operations described above, actual operating frequency switching can be performed at any timing. For example, the frequency switching can be performed in any of cycle 2, cycle 5, and cycle 11.

Next, a case in which the system operating frequency is changed from a low frequency to a high frequency will be explained. In this case, since the system operating frequency is switched to high frequency, the master 601A deasserts the bypass signal in cycle 13 in order to switch the register slices 603A and 605A to the non-bypass state.

When receiving the bypass signal, the register slice 603A changes to the non-bypass state in cycle 14 in accordance with the state transition shown in FIG. 19. At the same time, the register slice 603A resets the half-latch 421 and deasserts the bypass signal output.

In cycle 14, the register slice 604A also receives the bypass signal. Since, however, the register slice 604A holds the non-bypass state, it deasserts the bypass signal output in cycle 15 immediately after cycle 14, and the rest of the operation remains the same.

When receiving the bypass signal, the register slice 605A changes to the non-bypass state in cycle 17 in accordance with the state transition shown in FIG. 19. Simultaneously, the register slice 605A resets the half-latch 421 and deasserts the bypass signal output.

When the system operating frequency is to be raised as described above, timing limitations between paths cannot be met even if one register slice is in the bypass state. However, it is ensured that all the register slices are in the non-bypass state when the bypass signal reaches the slave, so the operating frequencies are switched at this timing.

Note that the register slice is formed by using half-latches in this embodiment, but the present invention is not limited to this embodiment.

For example, the register slice may also be formed by using a negative edge triggered flip-flop and positive edge triggered flip-flop, or by using only a positive edge triggered flip-flop. In this case, MUX is used as a bypass path to detour another path.

In this embodiment, when the system operating frequencies are to be switched, it is unnecessary to form any waiting period required to flash a register slice to be bypassed, and this makes seamless register slice bypass switching possible. As a consequence, the system operating frequency switching operation can be easily and rapidly performed.

Note that the present invention is not limited to any specific form disclosed in the embodiments described above, and includes all modifications within the scope of claims without departing from the spirit and scope of the invention.

The present invention can be applied to a system constituted by a plurality of devices (e.g., a host computer, interface, reader, and printer) or to an apparatus (e.g., a copying machine or facsimile apparatus) comprising a single device.

The objects of the present invention may also be achieved by supplying a recording medium recording the program code of software for implementing the functions of the above-mentioned embodiments to a system or apparatus, and reading out and executing the program code stored in the recording medium by a computer (or a CPU or MPU) of the system or apparatus.

In this case, the program code read out from the recording medium implements the functions of the embodiments, and the recording medium storing the program code constitutes the invention.

As this recording medium for supplying the program code, it is possible to use, e.g., a hard disk, optical disk, magnetooptical disk, CD-ROM, CD-R, magnetic tape, nonvolatile memory card, or ROM.

Also, besides the functions of the above embodiments are implemented by executing the readout program code by the computer, the present invention includes a case where an OS (Operating System) or the like running on the computer performs part or the whole of actual processing in accordance with instructions by the program code, thereby implementing the functions of the embodiments.

Furthermore, the present invention also includes a case where the program code read out from the recording medium is written in a memory of a function expansion card inserted into the computer or of a function expansion unit connected to the computer, and a CPU or the like of the function expansion card or function expansion unit performs part or the whole of actual processing in accordance with instructions by the program code, thereby implementing the functions of the above embodiments.

As many apparently widely different embodiments of the present invention can be made without departing from the spirit and scope thereof, it is to be understood that the invention is not limited to the specific embodiments thereof except as defined in the claims.

This application claims the benefit of Japanese Application Nos. 2005-199142 and 2005-199143 both filed on Jul. 7, 2005 and No. 2005-330651 filed on Nov. 15, 2005, which are hereby incorporated by reference herein in their entirety.

What is claimed is:

1. A bus system that transfers data from a first device to a second device, comprising:
    holding means for holding data inputted from the first device;
    reception means for receiving an instruction to make a transition from a non-bypass state to a bypass state, wherein in the non-bypass state the data held by the holding means is transferred, and in the bypass state the data is transferred without being held by the holding means; and
    transition means for making the transition from the non-bypass state to the bypass state after the data held by the holding means is outputted to the second device, in response to the instruction received by the reception means.

2. The system according to claim 1, wherein the instruction is received in accordance with an operating frequency.

3. The system according to claim 2, wherein the instruction is received when operating frequencies are switched.

4. The system according to claim 1, wherein the transition means makes the transition from the non-bypass state to the bypass state in accordance with a transition to a ready state in the second device.

5. The system according to claim 1, wherein a ready signal to the first device is suppressed when making the transition from the non-bypass state to the bypass state.

6. The system according to claim 1, wherein the holding means is reset when a transition is made to the bypass state.

7. A data transfer method in a bus system that includes holding means for holding data inputted from a first device and that transfers data from the first device to a second device, the method comprising
    a reception step of receiving an instruction to make a transition from a non-bypass state to a bypass state, wherein in the non-bypass state the data held by said holding means is transferred, and in the bypass state the data is transferred without being held by the holding means: and
    a transition step of making the transition from the non-bypass state to the bypass state after the data held by holding means is outputted to the second device, in response to the instruction received in the reception step.

8. The method according to claim 7, wherein the instruction is received in accordance with an operating frequency.

9. The method according to claim 8, wherein the instruction is received when operating frequencies are switched.

10. The method according to claim 7, wherein in the transition step, the transition from the non-bypass state to the bypass state is made in accordance with a transition to a ready state in the second device.

11. The method according to claim 7, wherein a ready signal to the first device is suppressed when making the transition from the non-bypass state to the bypass state.

12. The method according to claim 7, wherein the holding means is reset when a transition is made to the bypass state.

13. A computer-readable storage medium storing a computer program for causing a computer to execute a data transfer method in a bus system that includes holding means for holding data inputted from a first device, and that transfers data from the first device to a second device, the method comprising:
    a reception step of receiving an instruction to make a transition from a non-bypass state to a bypass state, wherein in the non-bypass state the data held by the holding means is transferred, and in the bypass state the data is transferred without being held by the holding means: and
    a transition step of making the transition from the non-bypass state to the bypass state after the data held by holding means is outputted to the second device, in response to the instruction received in the reception step.

14. A computer-readable storage medium storing a computer program for causing a computer to execute a data transfer method in a bus system that includes holding means for holding data inputted from a first device, and that transfers data from the first device to a second device, the method comprising:

a detection step of detecting a completion of outputting of data from the first device; and a selection step of selecting one of: a state of outputting the data from the first device to the second device by holding the data using the holding means, and a state of outputting the data from the first device to the second device without holding the data using the holding means, in accordance with the completion of outputting of the data from the first device.

15. A data transfer method in a bus system that includes holding means for holding data inputted from a first device, and that transfers data from the first device to a second device, the method comprising:

a detection step of detecting completion of outputting of data from the first device; and a selection step of selecting one of: a state of outputting the data from the first device to the second device by holding the data using the holding means, and a state of outputting the data from the first device to the second device without holding the data using the holding means, in accordance with the completion of outputting of the data from the first device.

16. The method according to claim 15, wherein, in the selection step, one of the state of outputting the data from the first device to the second device by holding the data using the holding means and the state of outputting the data from the first device to the second device without holding the data using the holding means is selected in accordance with an operating frequency.

17. The method according to claim 15, wherein a determination of whether to switch between the state of outputting the data by holding the data using the holding means and the state of outputting the data without holding the data using the holding means is made when operating frequencies are switched.

18. A bus system that transfers data from a first device to a second device, comprising:

holding means for holding data inputted from the first device;

detecting means for detecting a completion of outputting of data from the first device; and selecting means for selecting one of: a state of outputting the data from the first device to the second device by holding the data using the holding means, and a state of outputting the data from the first device to the second device without holding the data using the holding means, in accordance with the completion of outputting of the data from the first device.

19. The system according to claim 18, wherein the selecting means selects one of: the state of outputting the data from the first device to the second device by holding the data using the holding means, and the state of outputting the data from the first device to the second device without holding the data using the holding means, in accordance with an operating frequency.

20. The system according to claim 18, wherein the selecting means determines whether to switch between the state of outputting the data from the first device to the second device by holding the data using the holding means and the state of outputting the data from the first device to the second device without holding the data using the holding means, when operating frequencies are switched.

* * * * *